(12) United States Patent
Burdette et al.

(10) Patent No.: US 8,723,512 B1
(45) Date of Patent: May 13, 2014

(54) CIRCUITS AND METHODS FOR GENERATING A THRESHOLD SIGNAL USED IN A MAGNETIC FIELD SENSOR BASED ON A PEAK SIGNAL ASSOCIATED WITH A PRIOR CYCLE OF A MAGNETIC FIELD SIGNAL

(71) Applicants: Eric Burdette, Newmarket, NH (US); James M. Bailey, Concord, NH (US); Daniel S. Dwyer, Auburn, NH (US); Jeff Eagen, Manchester, NH (US); Glenn A. Forrest, Bow, NH (US); Christine Graham, Bow, NH (US); Eric Shoemaker, Pembroke, NH (US); P. Karl Scheller, Bow, NH (US)

(72) Inventors: Eric Burdette, Newmarket, NH (US); James M. Bailey, Concord, NH (US); Daniel S. Dwyer, Auburn, NH (US); Jeff Eagen, Manchester, NH (US); Glenn A. Forrest, Bow, NH (US); Christine Graham, Bow, NH (US); Eric Shoemaker, Pembroke, NH (US); P. Karl Scheller, Bow, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 0 days.

(21) Appl. No.: 13/685,287

(22) Filed: Nov. 26, 2012

(51) Int. Cl.
G01B 7/30 (2006.01)

(52) U.S. Cl.
USPC ........................ 324/207.25; 324/202; 324/174

(58) Field of Classification Search
USPC ............. 324/207.2, 207.21, 207.25, 174, 202
See application file for complete search history.

(56) References Cited

U.S. PATENT DOCUMENTS

| | | | |
|---|---|---|---|
| 4,185,265 A | 1/1980 | Griffin et al. | |
| 4,293,814 A | 10/1981 | Boyer | |
| 4,367,721 A | 1/1983 | Boyer | |
| 4,374,333 A | 2/1983 | Avery | |
| 4,443,716 A | 4/1984 | Avery | |
| 4,476,901 A | 10/1984 | Sainen | |
| 4,705,964 A | 11/1987 | Higgs | |
| 4,906,928 A | 3/1990 | Gard | |
| 4,992,731 A | 2/1991 | Lorenzen | |
| 5,103,171 A | 4/1992 | Petersen | |

(Continued)

FOREIGN PATENT DOCUMENTS

| | | |
|---|---|---|
| EP | 0 036 950 A1 | 10/1981 |
| EP | 0 602 697 A1 | 6/1994 |

(Continued)

OTHER PUBLICATIONS

Notice of Allowance; dated Aug. 2, 2013; for U.S. Appl. No. 12/793,813; 20 pages.

(Continued)

*Primary Examiner* — Jay Patidar
(74) *Attorney, Agent, or Firm* — Daly, Crowley, Mofford & Durkee, LLP

(57) ABSTRACT

A circuit to detect a movement of an object includes a magnetic field sensing element for generating a magnetic field signal proportional to a magnetic field associated with the object and a motion detector to generate a motion signal indicative of the movement of the object. The motion detector includes a peak identifying circuit to provide a peak signal and a peak sample selection module that selects a sample associated with one or more prior cycles of a magnetic field signal to generate a selected peak signal. The motion detector further includes a threshold generator to generate a threshold signal as a function of the selected peak signal and a comparator to compare the threshold signal with the magnetic field signal to generate the motion signal. Peak samples from prior magnetic field signal cycles may be averaged for use to establish the threshold signal. A method associated with the circuit is also described.

26 Claims, 12 Drawing Sheets

(56) References Cited

U.S. PATENT DOCUMENTS

| | | | |
|---|---|---|---|
| 5,291,133 A | 3/1994 | Gokhale et al. | |
| 5,317,258 A | 5/1994 | Setzer et al. | |
| 5,442,283 A | 8/1995 | Vig et al. | |
| 5,459,398 A | 10/1995 | Hansen et al. | |
| 5,477,142 A | 12/1995 | Good et al. | |
| 5,493,219 A | 2/1996 | Makino et al. | |
| 5,497,084 A | 3/1996 | Bicking | |
| 5,497,086 A | 3/1996 | Hynek et al. | |
| 5,510,706 A | 4/1996 | Good | |
| 5,650,719 A | 7/1997 | Moody et al. | |
| 5,694,038 A | 12/1997 | Moody et al. | |
| 5,729,127 A | 3/1998 | Tamura et al. | |
| 5,821,745 A | 10/1998 | Makino et al. | |
| 5,917,320 A | 6/1999 | Scheller et al. | |
| 6,091,239 A | 7/2000 | Vig et al. | |
| 6,191,576 B1 * | 2/2001 | Ricks et al. | 324/207.2 |
| 6,242,908 B1 | 6/2001 | Scheller et al. | |
| 6,456,063 B1 | 9/2002 | Moreno et al. | |
| 6,522,131 B1 | 2/2003 | Hiligsmann et al. | |
| 6,525,531 B2 | 2/2003 | Forrest et al. | |
| 6,785,639 B2 * | 8/2004 | Shirai et al. | 702/189 |
| 7,138,793 B1 | 11/2006 | Bailey | |
| 7,184,876 B2 | 2/2007 | Teulings et al. | |
| 7,362,094 B2 | 4/2008 | Voisine et al. | |
| 7,548,056 B2 | 6/2009 | Voisine et al. | |
| 7,619,406 B2 | 11/2009 | Voisine et al. | |
| 7,982,454 B2 | 7/2011 | Fernandez et al. | |
| 2009/0058404 A1 | 3/2009 | Kurumado | |
| 2010/0231202 A1 | 9/2010 | Scheller et al. | |
| 2011/0298447 A1 | 12/2011 | Foletto et al. | |
| 2011/0298448 A1 | 12/2011 | Foletto et al. | |
| 2011/0298449 A1 | 12/2011 | Foletto et al. | |
| 2011/0298450 A1 | 12/2011 | Foletto et al. | |
| 2012/0249126 A1 | 10/2012 | Friedrich et al. | |

FOREIGN PATENT DOCUMENTS

| | | |
|---|---|---|
| EP | 0 621 460 A1 | 10/1994 |
| EP | 0 875 733 A2 | 11/1998 |
| EP | 0 875 733 A3 | 11/1998 |
| EP | 0 875 774 A2 | 11/1998 |
| GB | 2 309 311 A | 7/1997 |
| WO | WO 00/57136 | 9/2000 |
| WO | WO 02/054014 A1 | 7/2002 |
| WO | WO 2011/152948 A1 | 12/2011 |
| WO | WO 2013/017211 A1 | 2/2013 |

OTHER PUBLICATIONS

Response filed Jun. 10, 2013; to PCT Written Opinion dated Dec. 13, 2012; 18 pages.
Allegro Data Sheet; A1425; "High Accuracy Analog Speed Sensor IC with Integrated Filter Capacitor and Dual Zero-Crossing Output Signal;" as published by Allegro Microsystems, Inc.; Jun. 18, 2004; pp. 1-13.
Allegro Data Sheet; "ATS612LSB Dynamic, Self-Calibrating, Peak-Detecting, Differential Hall-Effect Gear-Tooth Sensor;" as published by Allegro Microsystems, Inc.; Sep. 6, 1996; 16 sheets.
Allegro Data Sheet; "ATS630, ATS631 True Power on Zero Speed Gear Tooth Sensor Sub-assembly with Adaptive Thresholds;" as published by Allegro Microsystems, Inc.; undated; 8 sheets.
Allegro Data Sheet; ATS630LSA and ATS631LSA Zero-Speed, Self-Calibrating, Hall-Effect Gear-Tooth True Power-On Sensors; as published by Allegro Microsystems, Inc.; Oct. 28, 1996; 12 sheets.
Allegro Data Sheet; ATS673 and ATS674; "Self-Calibrating TPOS Gear Tooth Sensor ICs Optimized for Automotive Cam Sensing Applications;" as published by Allegro Microsystems, Inc.; Mar. 8, 2005; pp. 1-19.
Allegro Data Sheet; ATS675LSE; "Self-Calibrating TPOS Speed Sensor IC Optimized for Automotive Cam Sensing Applications;" as published by Allegro Microsystems, Inc.; Jul. 11, 2008; pp. 1-13.
Datel Intersil; Data Acquisition and Conversion Handbook, A Technical Guide, A/D and D/A Converting and their Applications; Jan. 1980; 3 sheets.
Fletcher; "An Engineering Approach to Digital Design;" Prentice Hall, Inc., Englewood Cliffs, NJ; Jan. 1980; pp. 14-19.
Graeme et al.; "Operational Amplifiers Design and Applications;" McGraw-Hill Book Company; Jun. 1, 1974; 3 sheets.
Motorola; "Linear/Interface Integrated Circuits;" Series D, Motorola Inc.; Jan. 1983; 2 sheets.
PCT Search Report and Written Opinion of the ISA; dated Aug. 11, 2011; for PCT Pat. App. No. PCT/US2011/035148; 11 pages.
PCT International Preliminary Report on Patentability and Written Opinion of the ISA; dated Dec. 13, 2012; for PCT Pat. App. No. PCT/US23011/035148; 9 pages.
PCT Search Report; dated Jun. 23, 2000; for PCT Pat. App. No. PCT/US00/02614; 2 sheets.
PCT International Preliminary Report on Patentability; dated May 17, 2001; for PCT Pat. App. No. PCT/US00/02614; 13 sheets.
PCT Search Report dated May 14, 2000; for PCT Pat. App. No. PCT/US01/42546; 1 sheet.
PCT International Preliminary Report on Patentability; dated Feb. 6, 2004; for PCT/US01/42546; 6 sheets.
Response to PCT Written Opinion; dated Aug. 27, 2002; for PCT/US01/42546; 1 sheet.
Acceptance of 312 Amendment; dated Jun. 28, 1999; for U.S. Appl. No. 08/847,703; 3 sheets.
Rule 37 C.F.R. § 1.312(a) Amendment; dated Dec. 17, 1998; for U.S. Appl. No. 08/847,703; 4 sheets.
Notice of Allowability; date is illegible; for U.S. Appl. No. 08/847,703; 4 sheets.
Response with Terminal Disclaimer; filed Sep. 14, 1998; for U.S. Appl. No. 08/847,703; 5 sheets.
Office Action; dated Jun. 26, 1998; for U.S. Appl. No. 08/847,703; 6 sheets.
Notice of Allowance; dated Jan. 26, 2001; for U.S. Appl. No. 09/275,209; 9 pages.
Response with Terminal Disclaimer; filed Dec. 5, 2000; for U.S. Appl. No. 09/275,209; 6 pages.
Office Action; dated Sep. 27, 2000; for U.S. Appl. No. 09/275,209; 4 pages.
Notice of Allowance; dated Aug. 26, 2002; for U.S. Appl. No. 09/859,093; 11 pages.
Response with Terminal Disclaimer; filed May 28, 2002; for U.S. Appl. No. 09/859,093; 7 pages.
Office Action; dated May 7, 2002; for U.S. Appl. No. 09/859,093; 4 pages.
Notification of Transmittal of the International Search Report (ISR) & Written Opinion (WO) of the ISA (including the ISR and WO of the International Searching Authority), dated Jan. 8, 2014, for International Appl. No. PCT/US2013/065848, 11 pgs.

* cited by examiner

CIRCUITS AND METHODS FOR GENERATING A THRESHOLD SIGNAL USED IN A MAGNETIC FIELD SENSOR BASED ON A PEAK SIGNAL ASSOCIATED WITH A PRIOR CYCLE OF A MAGNETIC FIELD SIGNAL

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to integrated circuits and, more particularly, to integrated circuits for detecting a movement or a rotation of a ferromagnetic object.

BACKGROUND OF THE INVENTION

Magnetic field sensors (e.g., rotation detectors) for detecting ferromagnetic articles and/or magnetic articles are known. The magnetic field associated with the ferromagnetic article or magnetic article is detected by a magnetic field sensing element, such as a Hall element or a magnetoresistance element, which provides a signal (i.e., a magnetic field signal) proportional to a detected magnetic field. In some arrangements, the magnetic field signal is an electrical signal.

The magnetic field sensor processes the magnetic field signal to generate an output signal that changes state each time the magnetic field signal crosses a threshold, either near to peaks (positive and/or negative peaks) or near to some other level, for example, zero crossings of the magnetic field signal. Therefore, the output signal has an edge rate or period indicative of a speed of rotation of the ferromagnetic or magnetic object, for example, a gear or a ring magnet.

One application for a magnetic field sensor is to detect the approach and retreat of each tooth of a rotating ferromagnetic gear, either a hard magnetic gear or a soft ferromagnetic gear that is back-biased with a magnet. In some particular arrangements, a ring magnet having magnetic regions (permanent or hard magnetic material) with alternating polarity is coupled to the ferromagnetic gear or other rotating device such as a wheel axle or is used by itself and the magnetic field sensor is responsive to approach and retreat of the magnetic regions of the ring magnet. In other arrangements, a gear is disposed proximate to a stationary magnet and the magnetic field sensor is responsive to perturbations of a magnetic field as the gear rotates.

In one type of magnetic field sensor, sometimes referred to as a peak-to-peak percentage detector, one or more threshold levels are equal to respective percentages of the peak-to-peak magnetic field signal. One such peak-to-peak percentage detector is described in U.S. Pat. No. 5,917,320 entitled "Detection of Passing Magnetic Articles While Periodically Adapting Detection Threshold" and assigned to the assignee of the present invention.

Another type of magnetic field sensor, sometimes referred to as a slope-activated detector (or peak-referenced detector), is described in U.S. Pat. No. 6,091,239 entitled "Detection Of Passing Magnetic Articles With a Peak Referenced Threshold Detector," also assigned to the assignee of the present invention. In the peak-referenced magnetic field sensor, the threshold signal differs from the positive and negative peaks (i.e., the peaks and valleys) of the magnetic field signal by a predetermined amount. Thus, in this type of magnetic field sensor, the output signal changes state when the magnetic field signal comes away from a peak or valley of the magnetic field signal by the predetermined amount.

It should be understood that, because the above-described peak-to-peak percentage threshold detector and the above-described peak-referenced detector both have circuitry that can identify the positive and negative peaks of a magnetic field signal, both such detectors include a circuit portion referred to herein as a "peak identifier", which is configured to detect positive peaks and/or negative peaks of the magnetic field signal. The peak-to-peak percentage threshold detector and the peak-referenced detector, however, each use the detected peaks in different ways to provide a so-called "threshold generator," which is configured to use the identified peaks to generate one or more threshold levels against which the magnetic field signal can be compared. This comparison can result in a so-called "PosComp" motion signal that has an edge rate representative of a speed of movement, e.g., rotation, of the moving object.

In order to accurately detect the positive and negative peaks of a magnetic field signal, in some embodiments, the rotation detector can be capable of tracking at least part of the magnetic field signal. To this end, typically, one or more digital-to-analog converters (DACs) can be used to generate a tracking signal, which tracks the magnetic field signal. For example, in the above-referenced U.S. Pat. Nos. 5,917,320 and 6,091,239, two DACs are used, one (PDAC) to detect the positive peaks of the magnetic field signal and the other (NDAC) to detect the negative peaks of the magnetic field signal.

Some types of rotation detectors perform one or more types of initialization or calibration, for example, at a time near to start up or power up of the rotation detector, or otherwise, from time to time as desired. During one type of calibration, the above-described threshold level is determined.

Once the above-described threshold level is initially determined, various schemes may be used for updating the threshold level to ensure that the threshold level remains at the desired relationship with respect to the peak-to-peak magnetic field signal level. For example, as described in U.S. Pat. No. 6,525,531 entitled "Detection of Passing Magnetic Articles while Adapting the Detection Threshold" and assigned to the assignee of the subject invention, the positive and negative detected peak signals (PDAC and NDAC, respectively) freely track "outwardly" to follow the magnetic field signal as it increases above PDAC and decreases below NDAC, respectively, following which such detected peak signals are selectively allowed to move "inward" (i.e., PDAC decreases and NDAC increases) to the level of the magnetic field signal upon transitions of the PosComp signal. Such threshold signal updating may be performed following an initial calibration mode, such as during a "running mode" of operation.

Some moving objects, for example, rotating moving objects, which are sensed by the above-described magnetic field sensors, exhibit irregular motions or have irregular features. For example, a gear may have wobble as it rotates, it may have run out (asymmetry about its axis of rotation), or it may have irregularities in its mechanical dimensions, for example, some gear teeth may be wider or taller than others. Additionally, anomalies in the conditions associated with the sensor or detected moving objects can cause intermittent oscillations of the object or other changes in the magnetic field detection. For example, when the magnetic field sensor is used to detect wheel speed in an automobile Anti-Lock Brake System (ABS), potholes can result in temporary changes to the axis of rotation of a wheel and thus, in the air gap (i.e., the distance from the object to the magnetic field sensing element). Such irregularities can cause variations in the magnetic field signal that can lead to generation of thresholds that are not ideal, thereby resulting in a PosComp signal that has edges that are not accurately placed relative to cycles of the magnetic field signal associated with features of the moving object.

It would, therefore, be desirable to provide a magnetic field sensor that can accurately identify a threshold level associated with a magnetic field signal, accurate even in the presence of irregularities in the motion of, or in the mechanical characteristics of, the moving object being sensed and/or in the presence of intermittent conditions associated with the sensor system.

SUMMARY OF THE INVENTION

According to an aspect of the invention, a circuit for detecting a movement of an object includes a magnetic field sensing element for generating a magnetic field signal proportional to a magnetic field associated with the object and having cycles including a present cycle and a motion detector configured to generate a motion signal indicative of the movement of the object and having edges associated with the cycles of the magnetic field signal. The motion detector includes a (a) peak identifying circuit for tracking at least one of a positive peak of the magnetic field signal or a negative peak of the magnetic field signal to provide a peak signal, a peak sample selection module coupled to receive the peak signal, configured to save samples of the peak signal, and configured to select a sample of the peak signal associated with a respective prior cycle of the magnetic field signal to generate a selected peak signal; (b) a threshold generator coupled to receive the selected peak signal and configured to generate a threshold signal as a function of the selected peak signal; and (c) a comparator coupled to receive the threshold signal, coupled to receive the magnetic field signal, and configured to compare the threshold signal with the magnetic field signal in order to generate the motion signal.

The peak sample selection module is configured to select a plurality of samples of the peak signal associated with a respective plurality of prior cycles of the magnetic field signal and further includes a function processor configured to combine the selected plurality of samples of the peak signal to generate the selected peak signal. The function processor may be configured to average the selected plurality of samples of the peak signal to generate the selected peak signal.

In some embodiments, the peak sample selection module may include an analog-to-digital converter coupled to receive the peak signal and configured to convert the peak signal to digital samples of the peak signal, a memory coupled to receive the digital samples and configured to save a plurality of the digital samples, and a digital-to-analog converter coupled to receive samples related to selected ones of the plurality of the digital samples to provide the selected peak signal. In other embodiments, the peak sample selection module may include an analog memory coupled to receive the peak signal and configured to save a plurality of analog samples of the peak signal and a circuit module configured to select analog samples from among the plurality of analog samples to provide the selected peak signal.

The peak sample selection module may include a multiplexer configured to select a sample of the peak signal associated with a present cycle of the magnetic field signal or to select samples of the peak signal associated with respective prior cycles of the magnetic field signal in response to a control signal. The control signal may cause the multiplexer to select the sample of the peak signal associated with the present cycle of the magnetic field signal during a calibration mode of operation before a predetermined number of cycles of the magnetic field signal have occurred and causes the multiplexer to select the samples of the peak signal associated with the respective prior cycles of the magnetic field signal during a running mode of operation after the predetermined number of cycles of the magnetic field signal have occurred.

Features include the threshold generator being configured to generate first and second different threshold signals based on the state of the motion signal and the peak identifying circuit including at least one of a PDAC or an NDAC. The threshold generator may include a resistor ladder coupled to receive the PDAC signal at a first end, coupled to receive the NDAC signal at a second end, and configured to generate the threshold signal at an intermediate tap between the first and second ends. In other embodiments, the threshold generator may include a first voltage source coupled to receive the PDAC signal and configured to generate a first threshold signal and a second voltage source coupled to receive the NDAC signal and configured to generate a second threshold signal.

In some embodiments, the magnetic field sensing element comprises at least two magnetic field sensing elements. A magnet may be provided in proximity to the magnetic field sensing element for generating the magnetic field. In some embodiments, the magnet, the magnetic field sensing element, and the motion detector are provided in a single integrated circuit package.

According to a further aspect of the invention, a method of detecting a movement of an object includes generating a magnetic field signal proportional to a magnetic field associated with the object, wherein the magnetic field signal has cycles including a present cycle and generating a motion signal indicative of the movement of the object and having edges associated with the cycles of the magnetic field signal. Generating the motion signal includes generating a peak signal in accordance with peaks of the magnetic field signal, saving samples of the peak signal, selecting a sample of the peak signal associated with a respective prior cycle of the magnetic field signal, generating a selected peak signal related to the selected samples of the peak signal, generating a threshold signal based on the selected peak signal, and comparing to the threshold signal with the magnetic field signal to generate the motion signal.

Additional steps may include selecting a plurality of samples of the peak signal associated with a respective plurality of prior cycles of the magnetic field signal and combining the plurality of samples of the peak signal to generate the selected peak signal. In some embodiments, combining includes averaging the plurality of samples of the peak signal to generate the selected peak signal.

Another method of detecting movement of an object includes generating a magnetic field signal with a magnetic field sensing element, wherein the magnetic field signal is proportional to a magnetic field associated with the object and has cycles including a present cycle, generating a peak signal that tracks at least a portion of the magnetic field signal, using the peak signal to generate a selected peak signal in accordance with a prior cycle of the magnetic field signal prior to the present cycle, generating a threshold signal based on the selected peak signal, and comparing the threshold signal to the magnetic field signal. Generating the selected peak signal may include selecting a first sample of the peak signal a first predetermined number of cycles prior to the present cycle, selecting a second sample of the peak signal a second predetermined number of cycles prior to the present cycle, and averaging the first and second samples to generate the selected peak signal.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
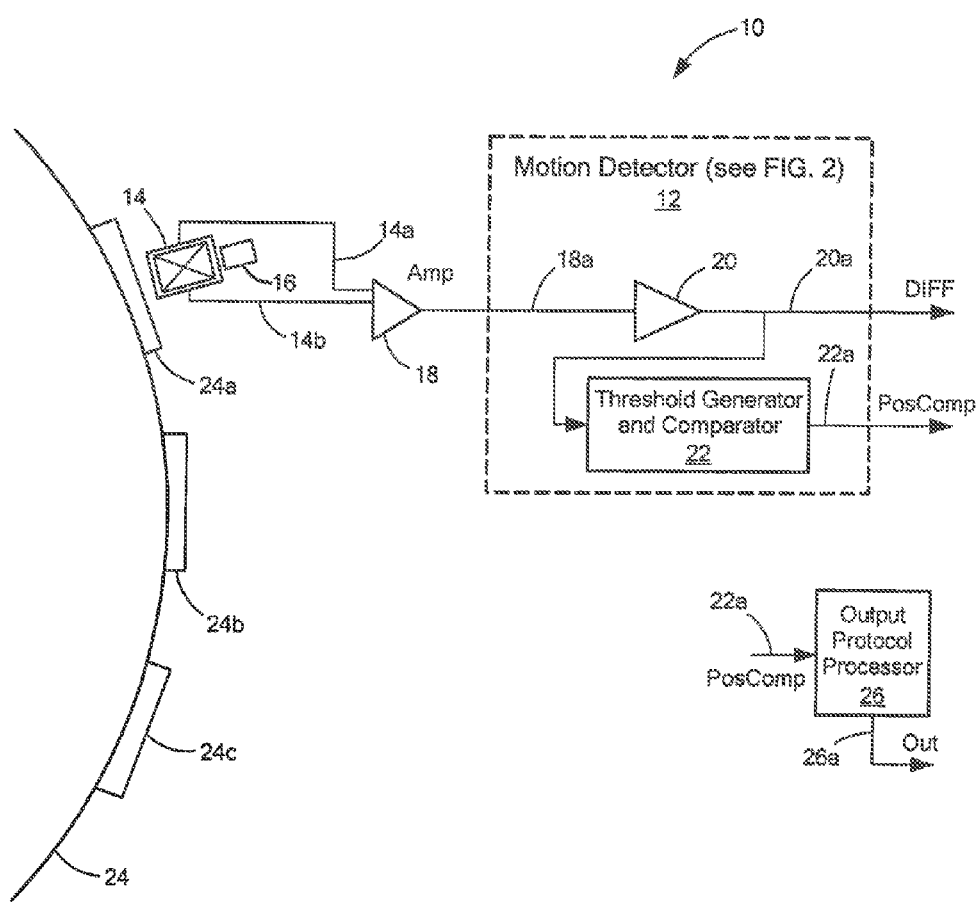
FIG. 1 is block diagram showing an exemplary magnetic field sensor in the form of a rotation sensor, having a motion detector with a threshold generator and comparator circuit.

Before describing the present invention, some introductory concepts and terminology are explained. As used herein, the term "magnetic field sensing element" is used to describe a variety of types of electronic elements that can sense a magnetic field. The magnetic field sensing elements can be, but are not limited to, Hall effect elements, magnetoresistance elements, or magnetotransistors. As is known, there are different types of Hall effect elements, for example, planar Hall elements, vertical Hall elements, and Circular Vertical Hall (CVH) elements. As is also known, there are different types of magnetoresistance elements, for example, semiconductor magnetoresistance elements such as and Indium antimonide (InSb) elements, anisotropic magnetoresistance (AMR) elements, giant magnetoresistance (GMR) elements, tunneling magnetoresistance (TMR) elements, and magnetic tunnel junction (MTJ) elements.

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, most, but not all, types of magnetoresistance elements tend to have axes of maximum sensitivity parallel to the substrate and most, but not all, types of Hall elements tend to have axes of sensitivity perpendicular to a substrate.

As used herein, the term "magnetic field sensor" is used to describe a circuit that includes a magnetic field sensing element. Magnetic field sensors are used in a variety of applications, including, but not limited to, a current sensor that senses a magnetic field generated by a current carried by a current-carrying conductor, a magnetic switch or proximity detector that senses the proximity of a ferromagnetic or magnetic object, a rotation detector that senses passing ferromagnetic articles, for example, magnetic domains of a ring magnet or teeth or slots of a ferromagnetic gear, and a magnetic field sensor that senses a magnetic field density of a magnetic field. Rotation detectors are used as examples herein. However, the circuits and techniques described herein apply also to any magnetic field sensor capable of detecting a motion of an object.

Peak-to-peak threshold detectors and peak-referenced detectors are described above. As used herein, the term "tracking circuit" or alternatively "peak identifier" is used to describe a circuit that can track and perhaps hold a signal representative of a positive peak or a negative peak (or both) of a magnetic field signal. It should be understood that both a peak-to-peak percentage threshold detector and a peak-referenced detector can both employ a tracking circuit or peak identifier. As used herein, the term "threshold generator" is used to describe any circuit configured to generate a threshold. As used herein, the term "comparator" is used to describe any circuit capable of comparing two or more signals, which can be analog or digital signals. Thus, a comparator can be, but is not limited to, an analog comparator configured to compare analog signals, a digital comparator configured to compare digital signals, or a programmable device, for example, a microprocessor having code therein for comparing two digital signals.

While circuits are shown below that use peak-to-peak percentage threshold detectors, in other embodiments, similar circuits can use peak-referenced detectors. Also, while circuits are shown below that use rotation detectors, in some embodiments, the rotations detectors can be motion detectors configured to detect other motions of an object, for example, linear motions.

Operation of a magnetic field sensor in a so-called "calibration mode," also referred to herein as an "initialization mode," is described herein. Reference is also made herein to operation of a magnetic field sensor in a so-called "running mode." The calibration mode can occur at the beginning of operation (or from time to time as desired) and the running mode is achieved at other times.

In general, during the calibration mode, an output signal from the magnetic field sensor may not be accurate, and during the running mode, the output signal is considered to be accurate, i.e., it has edges indicative of features of the magnetic field signal.

While a calibration time period is discussed herein, an end of which ends the calibration mode discussed herein in accordance with certain criteria, it should be recognized that other calibrations can be performed after the end of the indicated calibration time period. For example, an automatic gain control can continue calibrating after the end of the indicated calibration time period. At some point after the end of the indicated calibration time period, but not necessarily coincident with the end of the indicated calibration time period, the magnetic field sensors described herein can enter the running mode, during which updates to values of circuit parameters can be achieved in a different way than during the calibration mode. Such updates during the running mode can include updates to the threshold level signal according to circuits and methods described herein.

Referring now to FIG. 1, an exemplary magnetic field sensor 10 includes a magnetic field sensing element 14 for generating a signal 14a, 14b (i.e., a magnetic field signal) proportional to a magnetic field associated with an object or target 24. The magnetic field sensing element 14 can be, but is not limited to, a Hall effect element, a magnetoresistance element, or a magnetotransistor.

It should be understood that the object 24 need not be a part of the magnetic field sensor 10. The object 24 can be an object configured to rotate, for example, a ferromagnetic gear or ring magnet. The magnetic field sensor 10 can include a permanent magnet 16 disposed proximate to the magnetic field sensing element 14. In some embodiments, the magnetic field sensor 10 can be implemented as a packaged integrated circuit, and may contain the motion detector 12 and the magnet 16.

The magnetic field sensor 10 can include an amplifier 18 coupled to receive the signal 14a, 14b from the magnetic field sensing element 14 and configured to generate a signal 18a (also a magnetic field signal).

The magnetic field sensor 10 can also include a motion detector, here a rotation detector 12, having an amplifier 20 coupled to receive the signal 18a and configured to generate a signal 20a, also referred to herein as a DIFF signal, representative of the signal 18a. In some embodiments, the amplifier 20 is an automatic gain control (AGC) amplifier. The DIFF signal 20a is also referred to herein as a magnetic field signal. Thus, the signals 14a, 14b, 18a, and 20a are all magnetic field signals, and are all indicative of and proportional to a magnetic field experienced by the magnetic field sensing element 14 and associated with the object.

The rotation detector 12 can include a threshold generator and comparator circuit 22 coupled to receive the DIFF signal 20a and configured to generate a PosComp "motion signal" 22a indicative of a movement (i.e., rotation) of the object 24. In some embodiments, the motion signal 22a is a two state square wave having a frequency proportional to a speed of rotation of the object 24.

The magnetic field sensing element 14 can be responsive to motion of the object 24, for example, motion of ferromagnetic gear teeth or other features of associated with a gear, of which gear teeth 24a-24c upon a gear 24 are representative. To this end, the fixed magnet 16 can be disposed proximate to the magnetic field sensing element 14 and the gear teeth can disturb the magnetic field generated by the magnet 16 as the gear rotates. In other arrangements, the magnetic field sensing element 14 can be responsive to motion of magnetic regions 24a-24c upon a magnet 24, for example, magnetic regions of a ring magnet that is coupled to a gear or some other rotating structure such as a wheel axle. In some particular arrangements, the ring magnet 24 and a gear or axle are coupled together with a shaft or the like. In these particular arrangements, the ring magnet 24 can be proximate to the magnetic field sensing element 14, but the gear or wheel axle need not be proximate to the magnetic field sensing element 14. The features 24a-24c of the target object 24 will be referred to generally herein as "target regions" and the object 24 may be referred to as a target.

The magnetic field sensing element 14 is responsive to proximity of the target regions 24a-24c. In operation, the magnetic field sensing element 14 produces the magnetic field signal 14a, 14b (and also the magnetic field signals 18a, 20a) that may have a generally sinusoidal shape when the target 24 rotates, wherein each peak (positive and negative) of the sinusoid is associated with one of the target regions 24a-24c. Alternatively, the magnetic field signal 14a, 14b may have a substantially square-wave shape.

The magnetic field sensor 10 can also include an output protocol processor 26 coupled to receive the PosComp motion signal 22a and configured to generate an output signal 26a representative of the speed of rotation of the object 24. In some embodiments, the output signal 26a is a two state square wave having a frequency proportional to the speed of rotation of the object 24. In other embodiments, the output signal 26a comprises digital words representative of the speed of rotation of the object 24.

Figure 1A:
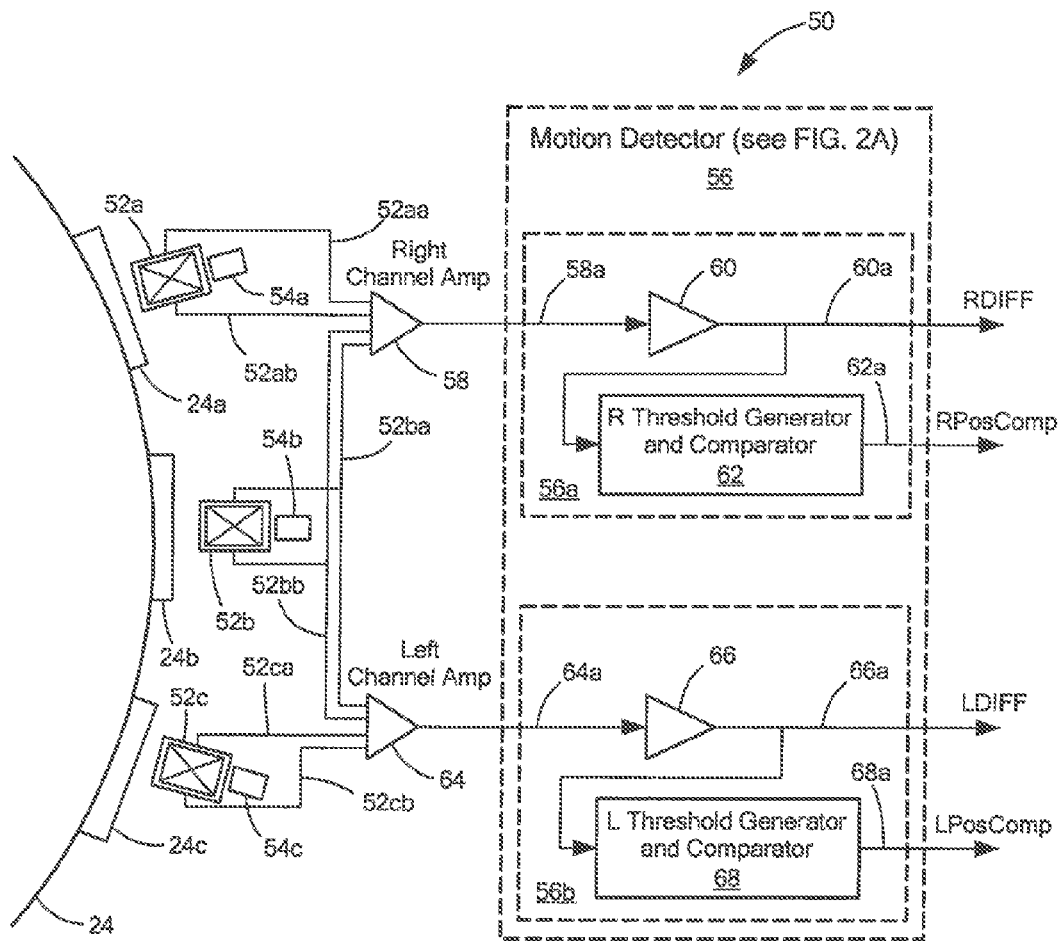
FIG. 1A is a block diagram showing another exemplary magnetic field sensor in the form of a rotation sensor, having two motion detectors each with a respective threshold generator and comparator circuit.
Figure 1A:
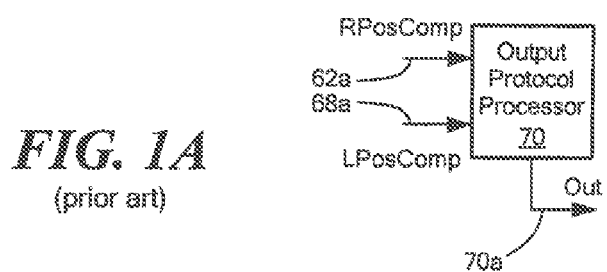

Referring now to FIG. 1A, in which like elements of FIG. 1 are shown having like reference designations, another exemplary magnetic field sensor 50 includes a plurality of magnetic field sensing elements 52a-52c for generating signals 52aa, 52ab, 52ba, 52bb, 52ca, 52cb (magnetic field signals) proportional to a magnetic field.

The magnetic field sensor 50 includes a right channel amplifier 58 coupled to the magnetic field sensing elements 52a and 52b and configured to generate a signal 58a (also a magnetic field signal). The magnetic field sensor 50 also includes a left channel amplifier 64 coupled to the magnetic field sensing elements 52b and 52c and configured to generate a signal 64a (also a magnetic field signal). The signal 58a is proportional to a magnetic field at a first location relative to the object 24 and the signal 64a is proportional to a magnetic field at a second location relative to the object 24. The first and second locations are associated with right and left electronic channels, respectively.

The magnetic field sensor 50 also includes motions detectors, here rotation detectors 56, which includes right and left channel motion detectors, here rotation detectors 56a, 56b, respectively. The rotation detector 56a can include an amplifier 60 coupled to receive the signal 58a and configured to generate an RDIFF signal 60a (also a magnetic field signal) representative of the signal 58a. The rotation detector 56b can include an amplifier 66 coupled to receive the signal 64a and configured to generate an LDIFF signal 66a (also a magnetic field signal) representative of the signal 64a. In some embodiments, the amplifiers 60, 66 are automatic gain control (AGC) amplifiers.

The rotation detector 56a also includes a right channel threshold generator and comparator circuit 62 coupled to receive the RDIFF signal 60a and configured to generate an RPosComp motion signal 62a indicative of a movement (i.e., rotation) of the object 24. The rotation detector 56b also includes a left channel threshold generator and comparator circuit 68 coupled to receive the LDIFF signal 66a and configured to generate an LPosComp motion signal 68a indicative of the movement (i.e., rotation) of the object 24.

In some embodiments, the motion signals 62a, 68a are each two state square waves having a frequency proportional to the speed of rotation of the object 24. It will be understood that, since the magnetic field sensing elements 52a-52c are at different physical locations, the RPosComp signal 62a can have a different phase than the LPosComp signal 68a. Furthermore, if the object 24 rotates in one direction, the phase of the RPosComp 62a will lead the phase of the LPosComp signal 68a, but if the object 24 rotates in the opposite direction, the phase relationship will reverse. Therefore, the magnetic field sensor 50, unlike the magnetic field sensor 10 of FIG. 1, is able to generate signals representative not only of the speed of rotation of the object 24, but also signals representative of the direction of rotation of the object 24.

The above designations "left" and "right" (also L and R, respectively) are indicative of physical placement of the magnetic field sensors 52a-52c relative to the object 24 and correspond arbitrarily to left and right channels. In the illustrative embodiment, three magnetic field sensing elements 52a-52c are used for differential magnetic field sensing, with the central sensor 52b used in both channels. While three magnetic field sensors 52a-52c are shown, it should be appreciated that two or more magnetic field sensors can be used. For example, in an embodiment using only two magnetic field sensors 52a, 52c, only magnetic field sensor 52a can be coupled to the right channel amplifier 58 and only the magnetic field sensor 54c can be coupled to the left channel amplifier 64.

The magnetic field sensor 50 can also include an output protocol processor 70 coupled to receive the RPosComp signal 62a and the LPosComp signal 68a and configured to generate an output signal 70a representative of at least the speed of rotation of the object 24. In some embodiments, the output signal 70a is also representative of the direction of rotation of the object 24.

In some embodiments the output signal 70a is a two state square wave having a frequency proportional to the speed of rotation of the object 24 and a duty cycle (or pulse width or on-time duration) representative of the direction of the rotation of the object 24. In other embodiments, the output signal 70a comprises digital words representative of the speed of rotation of the object 24 and the direction of rotation.

Figure 2:
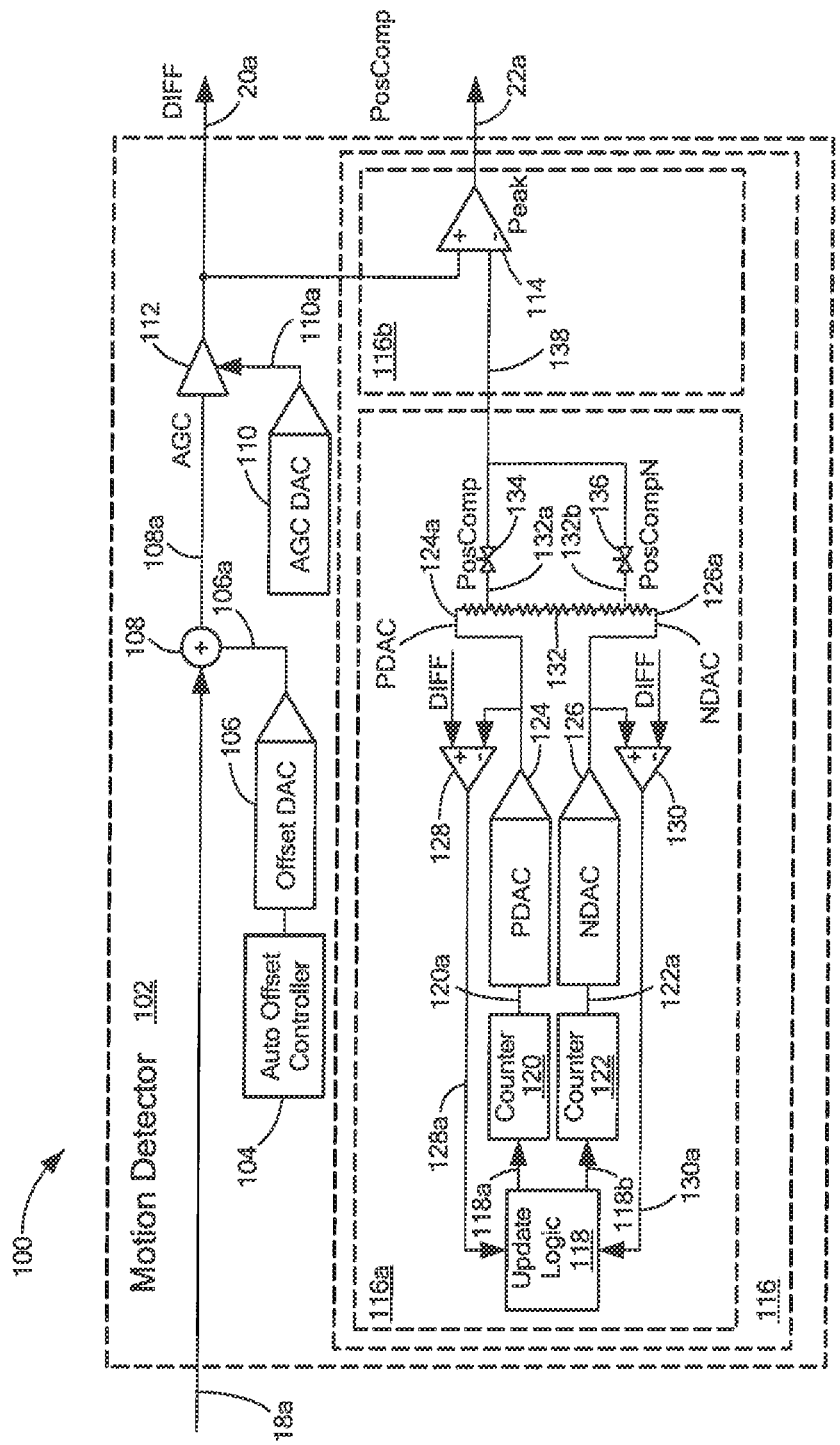
FIG. 2 is a block diagram showing an exemplary motion detector that can be used as the motion detector of FIG. 1, having two digital-to-analog converters (DACs), a positive DAC (PDAC) and a negative DAC (NDAC)

Referring now to FIG. 2, in which like elements of FIG. 1 are shown having like reference designations, a circuit 100 includes an exemplary rotation (motion) detector 102, which can be the same as or similar to the rotation detector 12 of FIG. 1, but shown in greater detail.

The rotation detector 102 is coupled to receive the magnetic field signal 18a of FIG. 1. The magnetic field signal 18a can include an undesirable DC offset. Therefore, an auto offset controller 104, an offset digital-to-analog converter (DAC) 106, and a summer 108 can be provided in order to reduce or eliminate the DC offset.

The rotation detector 102 can also include an automatic gain control (AGC) amplifier 112 coupled to receive an output signal 108a generated by the summer 108 and configured to generate the DIFF signal 20a having an amplitude within a controlled amplitude range. It should be understood that the DIFF signal 20a is representative of the magnetic field experienced by one or more magnetic field sensing elements, for example, the magnetic field sensing element 14 of FIG. 1.

The DIFF signal 20a is coupled to a comparator 114 (a comparator part 116b of the threshold generator and comparator circuit 116). The comparator 114 also receives a threshold signal 138. Generation of the threshold signal 138 is further described below. The threshold comparator 114 is configured to generate the PosComp signal 22a.

The threshold signal 138 can switch between two different values. In one particular embodiment, the threshold signal 138 can be determined by a threshold detector 116a (a threshold generator part 116a of the threshold generator and comparator circuit 116). A first threshold signal 132a, sometimes referred to as an operate threshold, can be a first predetermined percentage e.g., eighty-five percent, of a peak-to-peak magnitude of the DIFF signal 20a, e.g., near to but below a positive peak of the DIFF signal 20a. A second threshold signal 132b, sometimes referred to as a release threshold, can be a second predetermined percentage, e.g., fifteen percent, of a peak-to-peak magnitude of the DIFF signal 20a, e.g., near to but above a negative peak of the DIFF signal 20a. The threshold signal 138 can, therefore, be relatively near to and below a positive peak of the DIFF signal 20a at some times and relatively near to and above a negative peak of the DIFF signal 20a at other times. Therefore, the comparator 114 can generate the PosComp signal 22a having edges closely associated with the positive and negative peaks of the DIFF signal 20a.

However, in other embodiments, the threshold signal 138 can take on two other different values, for example, two values near to zero crossings of the DIFF signal 20a, and therefore, the threshold comparator 114 can generate the PosComp signal 22a having edges closely associated with the zero crossings of the DIFF signal 20a. In still other embodiments, the threshold signal 138 can take on two other different values as may be generated, for example, by a peak-referenced detector, which is described above.

The threshold signal (or voltage) 138 is generated by the threshold generator and comparator circuit 116, which can be the same as or similar to the threshold generator and comparator circuit 22 of FIG. 1.

The threshold generator part 116a of the threshold generator and comparator circuit 116 can include counters 120, 122, a PDAC 124, an NDAC, 126, first and second comparators 128, 130, respectively, an update logic circuit 118, a resistor ladder 132, and first and second switches 134, 136, respectively. The PDAC 124 is coupled to receive a count signal 120a from the counter 120. The PDAC 124 is configured to generate a PDAC output signal 124a coupled to a first end of the resistor ladder 132. The NDAC 126 is coupled to receive a count signal 122a from the counter 122. The NDAC 126 is configured to generate an NDAC output signal 126a coupled to a second end of the resistor ladder 132. The PDAC output signal 124a and the NDAC output signal 126a are also referred to herein as peak tracking signals or simply tracking signals.

In operation, the PDAC output signal 124a can sometimes track the DIFF signal 20a and sometimes hold a positive peak of the DIFF signal 20a and the NDAC output signal 126a can sometimes track the DIFF signal 20a and sometimes hold a negative peak of the DIFF signal 20a.

The first switch 134 is coupled to receive a first threshold signal 132a signal from a first tap of the resistor ladder 132 and the second switch 136 is coupled to receive a second threshold signal 132b signal from a second tap of the resistor ladder 132. The first switch 134 can be controlled by the PosComp signal 22a and the second switch 136 can be controlled by an inverted PosComp signal 22a, i.e. a PosCompN signal.

The first comparator 128 is coupled to receive the PDAC signal 124a and also coupled to receive the DIFF signal 20a and configured to generate a first feedback signal. The second comparator 130 is coupled to receive the NDAC signal 126a and also coupled to receive the DIFF signal 20a and configured to generate a second feedback signal 130a.

Figure 2A:
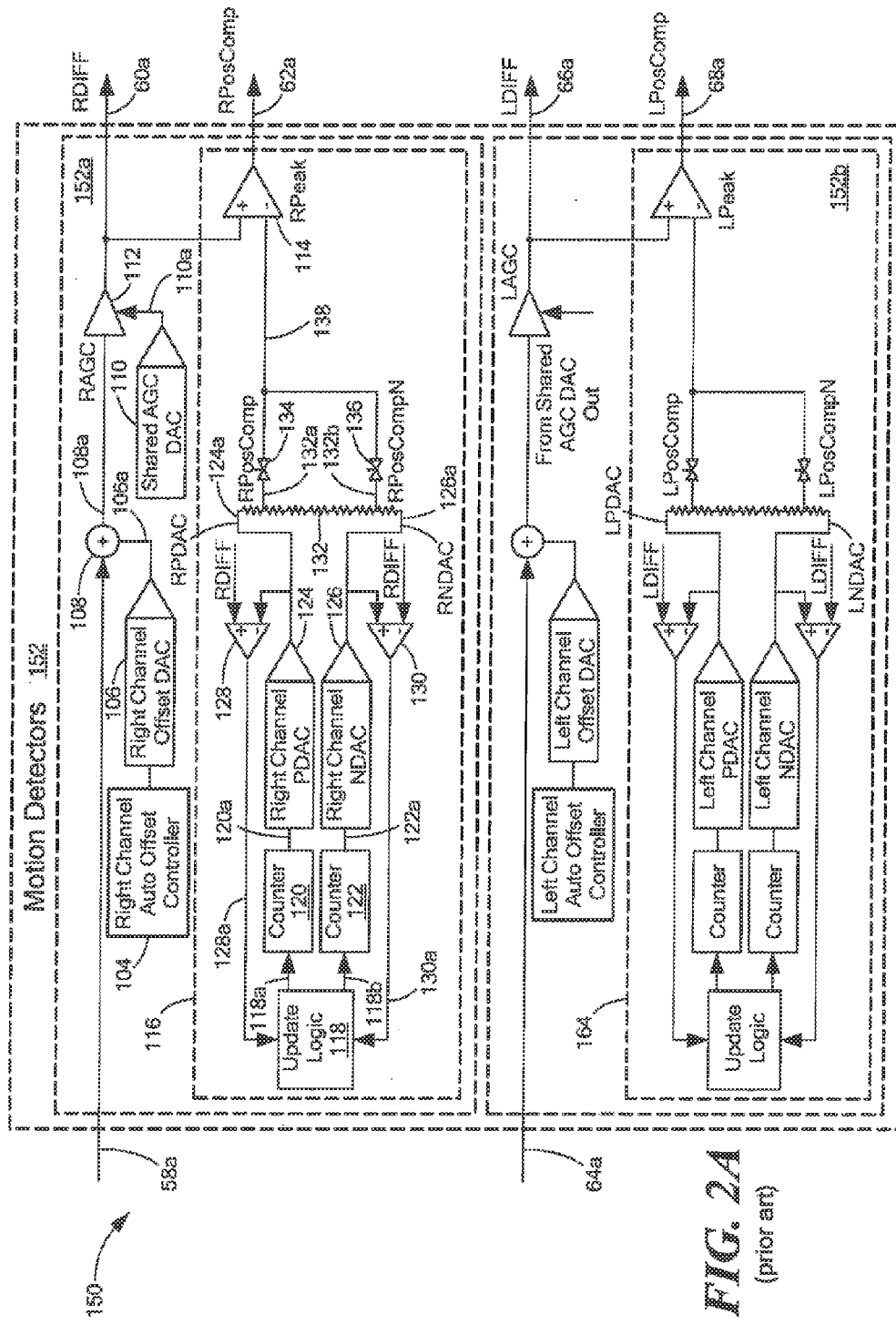
FIG. 2A is a block diagram showing two exemplary motion detectors that can be used as the two motion detectors of FIG. 1A, having two respective PDACs and two respective NDACs.

Referring now to FIG. 2A, in which like elements of FIG. 1A are shown having like reference designations, a circuit 150 includes two exemplary rotation (motion) detectors 152, identified as 152a, 152b, which can be the same as or similar to the rotation detectors 56a, 56b of FIG. 1A, but shown in greater detail.

The rotation detectors 152 can include two threshold generator and comparator circuits 116, 164, which can be the same as or similar to the threshold generator and comparator circuit 62, 68 of FIG. 1A, but shown in greater detail. The rotation detector 152a is coupled to receive the magnetic field signal 58a of FIG. 1A and the rotation detector 152b is coupled to receive the magnetic field signal 64a of FIG. 1A. The rotation detector 152a is configured to generate the RPosComp signal 62a (FIG. 1A) and the RDIFF signal 60a (FIG. 1A), and the rotation detector 152b is configured to generate the LPosComp signal 68a (FIG. 1A) and the LDIFF signal 66a (FIG. 1A).

Operation of each one of the two rotation detectors 152a, 152b is the same as or similar to operation of the rotation detector 102 of FIG. 2, so is not discussed here again.

Figure 2B:
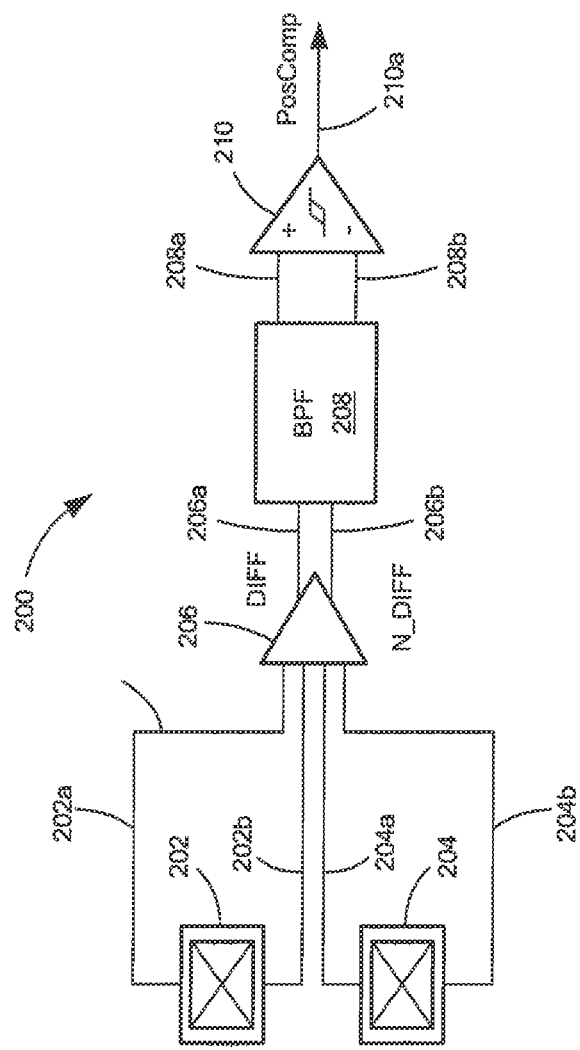
FIG. 2B is a block diagram of another exemplary magnetic field sensor in the form of a rotation sensor and having a zero crossing detector.

Referring now to FIG. 2B, a so-called "zero-crossing detector" 200, a threshold generator and comparator circuit, can be compared with the threshold generator and comparator circuit 116 of FIG. 2. Here, an amplifier 206 is coupled to receive signals 202a, 202b, 204a, 204b from two magnetic field sensing elements 202, 204. The amplifier is configured to generate a differential output signal 206a, 206b coupled to a band pass filter (BPF) 208. The differential signal 206a, 206b is comparable to a differential DIFF signal. The BPF 208 is configured to generate a differential filtered signal 208a, 208b. A comparator is coupled to receive the differential filtered signal 208a, 208b and configured to generate a motion signal, PosComp 210a.

In operation, the signals 208a, 208b essentially operate as thresholds. The signals 208a, 208b cross each other at or near a zero crossing of each respective signal 208a, 208b.

Figure 3:
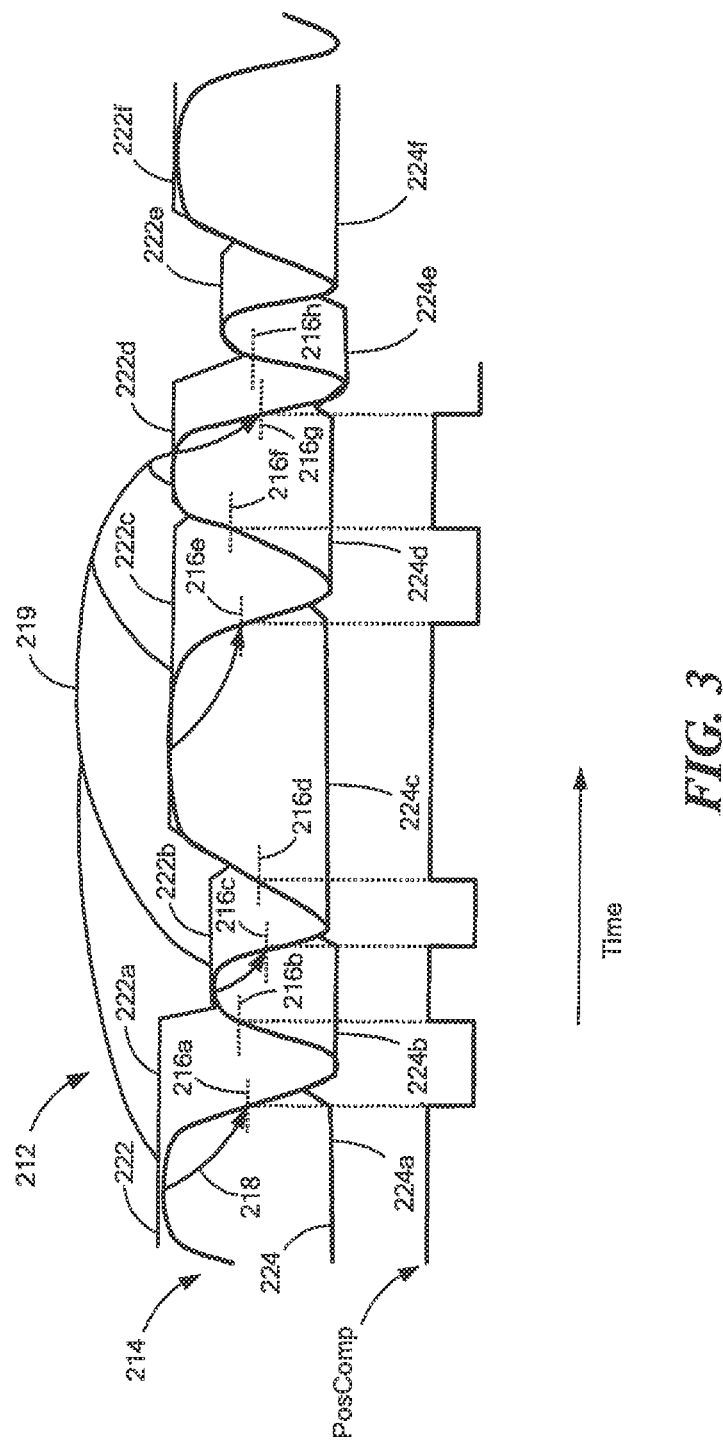
FIG. 3 is a graph showing a magnetic field signal, with associated PDAC and NDAC signals and thresholds, and the resulting PosComp signal.

Referring now to FIG. 3, a graph 212 has a horizontal axis with a scale in arbitrary units of time, which can be related to rotation angle or linear displacement of the object 24 and a vertical axis with a scale in arbitrary units of voltage, which can be related to magnetic field strength (Gauss) or an associated digital value. The waveform 214 can be a DIFF signal representative, for example, of the DIFF signal 20a of FIGS. 1 and 2 with cycles of the signal 214 being indicative of target regions 24a-24c of FIG. 1A passing the magnetic field sensing elements 52a-52c of FIG. 1A. In normal operation, the PDAC signal 222 can reach and acquire positive peaks of the DIFF signal 214. Similarly, an NDAC signal 224 can reach and acquire negative peaks of the DIFF signal 214. Thresholds 216a-216h can be calculated during cycles of the DIFF signal 214. The thresholds 216a-216h may correspond, for example, to threshold signals as may be taken from taps of a threshold generator resistor ladder.

According to an aspect of the invention, one or more thresholds are generated on the basis of samples of a peak signal (PDAC and/or NDAC) taken during one or more prior cycles of the DIFF signal 214. In one particular embodiment, each of a first predetermined number of thresholds, such as thresholds 216a-216f, are based on peak signal samples taken during the respective cycle of the DIFF signal 214; whereas, after the predetermined number of DIFF signal cycles has occurred, each threshold 216g-216h for example is based on a mathematical combination such as an average of the peak signal samples taken during prior cycles (and possibly also the present cycle) of the DIFF signal 214. For example, thresholds 216a and 216b may be based on peak signal samples taken during the first shown DIFF signal cycle, threshold levels 216c and 216d may be based on peak signal samples taken during the second shown DIFF signal cycle, and so forth until a predetermined signal cycle, such as a fourth signal cycle. Arrows, of which arrow 218 is representative, illustrate use of a PDAC signal sample from the present DIFF signal cycle to establish the threshold for the present cycle. The threshold levels 216g and 216h used during the fourth DIFF signal cycle are established by averaging the peak signal samples taken during each of the previous four signal cycles (i.e., the present cycle and the three prior cycles). Arrow 219 illustrates use of peak signal samples from present and prior cycles of the DIFF signal to generate threshold 216g.

While the DIFF signal 214 of FIG. 3 is used to illustrate embodiments in which the threshold signal is based on an average of peak signal samples from a predetermined number of prior DIFF signal cycles, it is also possible to establish the threshold signal based on DIFF signal cycles from a prior revolution of the target as will be explained with reference to FIG. 3A. Furthermore, it is also possible to establish the threshold signal based on a mathematical combination of prior threshold signals (as opposed to a mathematical combination of previous peak signal samples) as is also explained with reference to FIG. 3A.

Also shown in FIG. 3 is the PosComp signal that transitions each time the DIFF signal 214 crosses a threshold 216a-216h as shown.

Figure 3A:
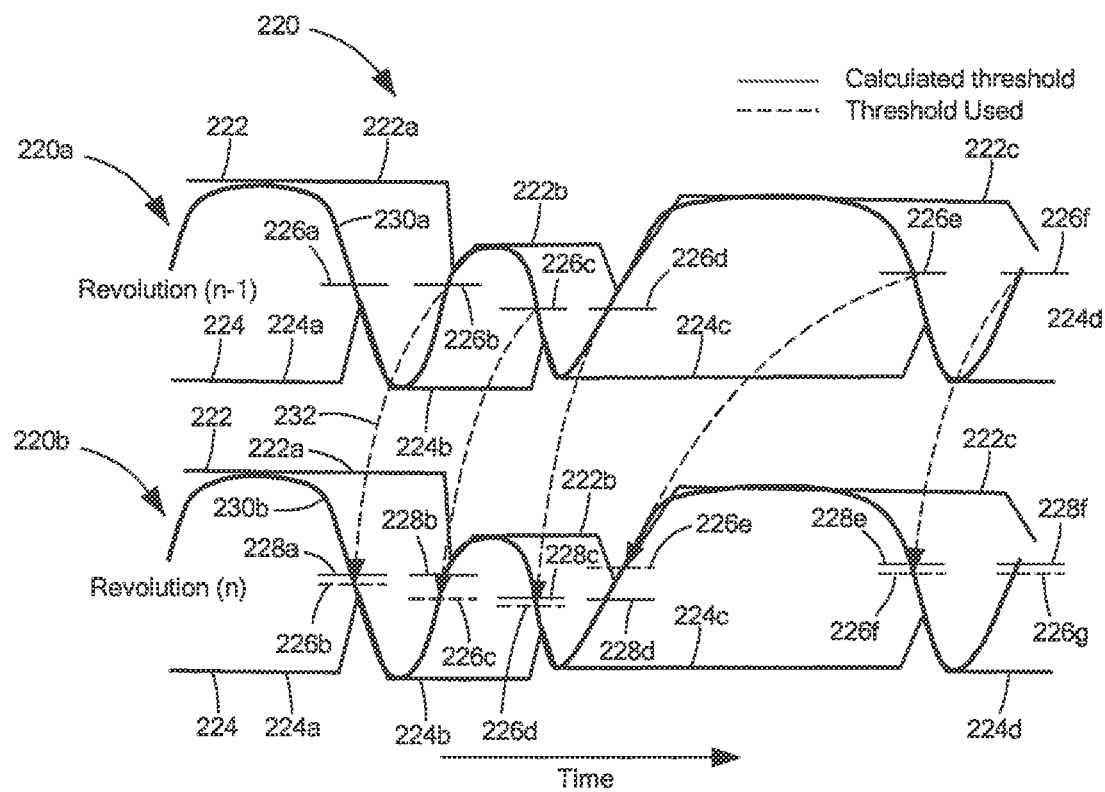
FIG. 3A is a graph showing two magnetic field signals, each at a different revolution of a moving object being sensed, with associated PDAC and NDAC signals and thresholds.

Referring now to FIG. 3A, a graph 220 includes two parts 220a, 220b, each part having a horizontal axis with a scale in arbitrary units of time, which can be related to rotation angle or linear displacement of the object 24, and a vertical axis with a scale in arbitrary units of voltage or current, which can be related to magnetic field strength (Gauss) or an associated digital value.

Cycles of each one of the parts 220a, 220b are indicative of target regions, e.g., the gear teeth 24a-24c of FIG. 1A, passing by the magnetic field sensing elements, e.g., the magnetic field sensing elements 52a-52c of FIG. 1A. The parts 220a, 220b are each indicative of a different revolution, and at the same positions (rotational angles), of the target object 24 of FIG. 1.

The part 220b includes a DIFF signal 230b representative, for example, of the DIFF signal 20a of FIGS. 1 and 2. The DIFF signal 230b is representative of an nth revolution of the object 24 of FIG. 1. In normal operation, a PDAC signal 222, which is similar to the PDAC signal 124a of FIG. 2, can reach and acquire positive peaks of the DIFF signal 230b. Similarly, an NDAC signal 224, which is similar to the NDAC signal 126a of FIG. 2, can reach and acquire negative peaks of the DIFF signal 230b.

The part 220a includes a DIFF signal 230a also representative, for example, of the DIFF signal 20a of FIGS. 1 and 2. The DIFF signal 230a is representative of an (n−1)st revolution, i.e., a prior revolution, of the target 24 of FIG. 1. In normal operation, the PDAC signal 222 can reach and acquire positive peaks of the DIFF signal 230a. Similarly, an NDAC signal 224 can reach and acquire negative peaks of the DIFF signal 230a.

Thresholds 226a-226f can be calculated during cycles of the DIFF signal 230a on the (n−1)st revolution of the target 24. Thresholds 228a-228f can be calculated during cycles of the DIFF signal 230b, but on the nth revolution of the target 24. The thresholds 226a-226f correspond, for example, to threshold signals as may be taken from a center tap of the resistor ladder 132 of FIG. 2, i.e., a 50% point between the positive and negative peaks of the DIFF signal 230a on the (n−1)st revolution of the target 24. The thresholds 228a-228f correspond, for example, to threshold signals as may be taken from the center tap of the resistor ladder 132 on the nth revolution of the target 24.

Arrows, of which an arrow 232 is representative, indicate that during the nth revolution of the target represented by the DIFF signal 230b, during which the thresholds 228a-228f could otherwise be used, instead, the thresholds 226a-226f are used. On an nth revolution of the target 24, the threshold determined during an (n−1)st revolution is used, shifted by one edge. In other words, on the nth revolution, threshold 226b is used instead of threshold 228a, threshold 226c is used instead of threshold 228b, and so on. A threshold from a prior cycle is used, but the threshold is used that is associated with the next edge of the target 24.

Similarly, on an (n+1)st revolution of the target 24, for which a DIFF signal is not shown, the thresholds 228a-228f could be used. Thus, thresholds are used from a prior revolution of the target 24.

The waveforms of FIG. 3A illustrate use of thresholds that are based on thresholds generated during present and/or prior DIFF signal cycles; whereas the waveforms of FIG. 3 illustrate use of thresholds that are based on PDAC or NDAC signal samples taken during present and/or prior DIFF signal cycles. Thus, it will be appreciated that thresholds may be based on peak signal samples taken during present and/or prior target revolutions and/or DIFF signal cycles.

It will be apparent that, on the nth revolution of the target 24, while use of only thresholds from the (n−1)st revolution is shown, in other embodiments, any combination of thresholds from prior and present cycles and revolutions could be used. For example, in one embodiment, several prior thresholds associated with the same target region as the present target region now at the nth revolution can be averaged. For example, thresholds associated with the same target region but at the (n−1)th, (n−2)th, . . . , (n−M)th revolutions can be averaged to provide a threshold to be used for the same target region at the nth revolution.

In still other embodiments, prior thresholds associated with more than one target region at the current, nth, revolution can be used. For example, thresholds associated with the different target region (n−1)th, (n−2)th, . . . , (n−N)th target regions, all in the nth revolution can be averaged to provide a threshold to be used for a target region at the nth revolution.

In still other embodiments, not only prior thresholds, but also the presently determined threshold can be used in either of the above two averages. Furthermore, while averages are discussed above, any combination of the thresholds can be used. The combinations can include, but are not limited to, RMS combinations and weighted averages.

In still other embodiments, any combination of present and prior thresholds from present and prior cycles and/or revolutions can be used.

All of the above-described concepts of using thresholds from prior cycles and/or revolutions can be similarly applied to using peak samples (rather than thresholds) from prior cycles and/or revolutions to generate thresholds.

Accurate threshold placement and resulting edge timing accuracy of the PosComp signals 62a, 68a of FIG. 2A is important in applications where the edges are used to represent exact rotational angle of an object. Such accuracy may be important when the rotation (motion) detectors 152 of FIG. 2A, are used, for example, to sense rotation of a camshaft in an automobile in order to control various engine timings, to sense drive shaft position for proper transmission operation and/or to sense rotation of wheels in an automobile ABS system. More generally however, the described circuitry and techniques are applicable to any applications that would benefit from threshold accuracy, including without limitation automotive and industrial motor or positioning applications such as servo motor control.

Figure 4:
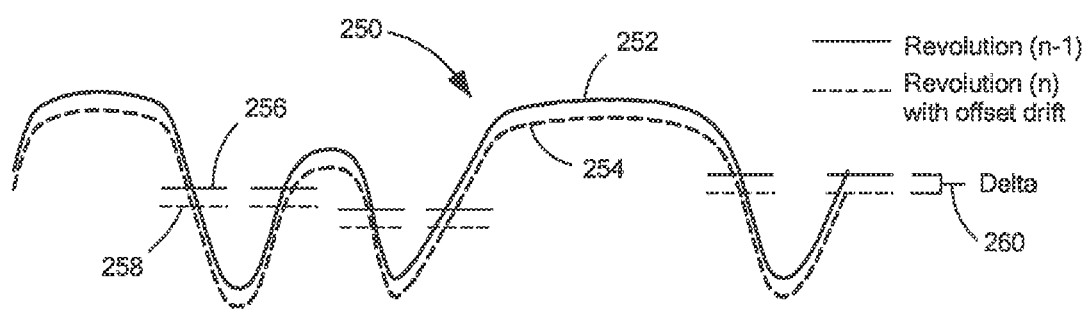
FIG. 4 is a graph showing two magnetic field signals, each at a different revolution of a moving object being sensed, and each having a different DC offset voltage.

Referring now to FIG. 4, a graph 250 has a horizontal axis with a scale in arbitrary units of time and a vertical axis with a scale in arbitrary units of voltage. The graph 250 includes a DIFF signal 252 and a DIFF signal 254, each representative, for example, of the DIFF signal 20a of FIGS. 1 and 2, but each on a different revolution of the gear 24 of FIGS. 1 and 2. A DC offset 260 is shown between the two DIFF signals 252, 254. In accordance with the DC offset 260, different thresholds, e.g., thresholds 256, 258 are determined on each cycle, not yet taking into account any threshold corrections.

By sensing the offset change 260, only available since a history of the thresholds from a plurality of revolutions is stored using techniques described below, a change or drift of the offset can be calculated. The offset change can be applied to the threshold used at each gear tooth (e.g., to thresholds 226a-226f and 228a-228f of FIG. 3) in order to even more accurately position the thresholds.

Figure 5:
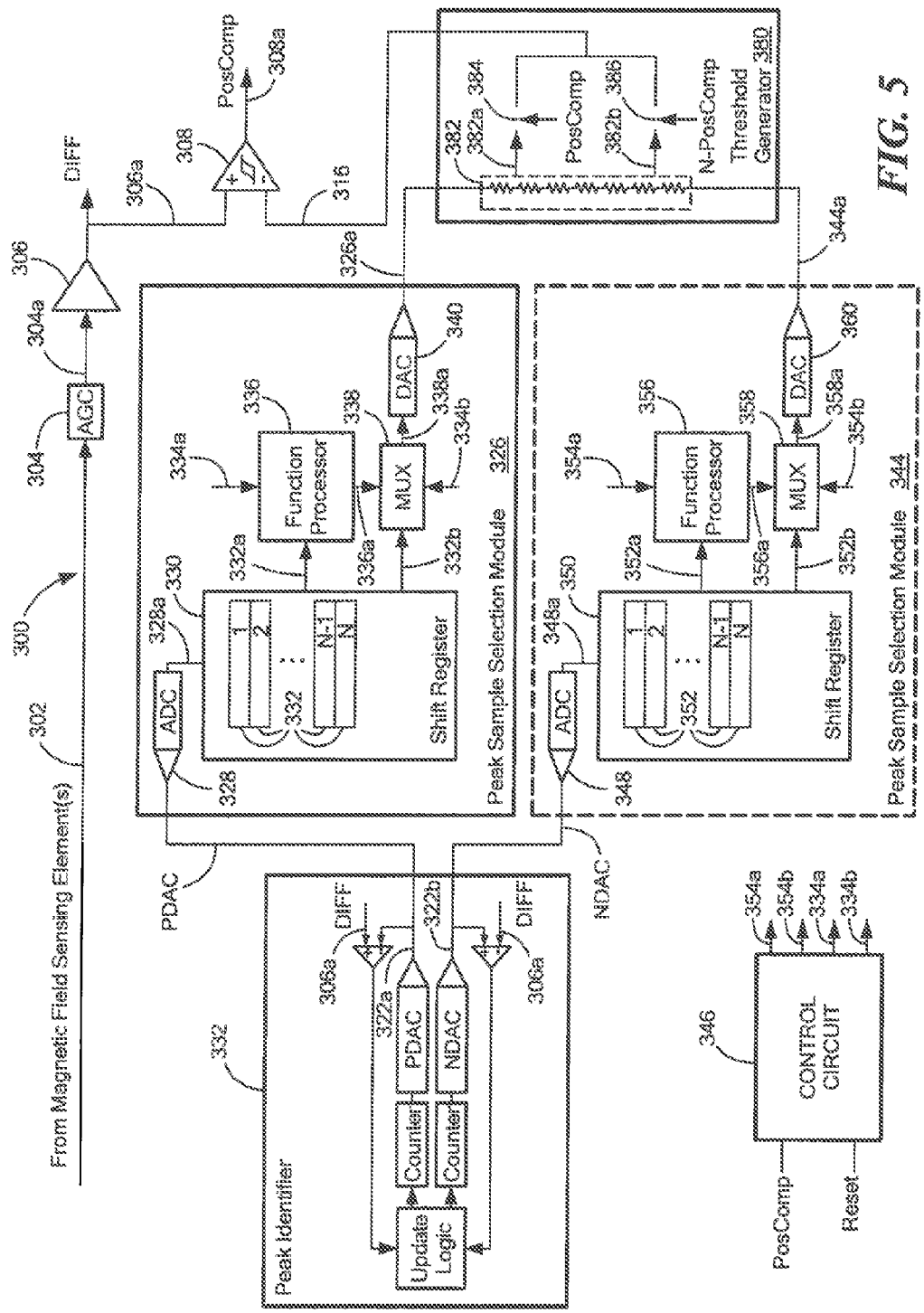
FIG. 5 is a block diagram of an exemplary motion detector that can be used as the motion detectors of FIGS. 1, 1A, 2, and 2A, having an analog peak identifier, a peak sample selection module, a threshold generator, and an analog comparator.

Referring now to FIG. 5, a circuit 300 (i.e., a motion detector) for detecting a movement of an object includes at least one magnetic field sensing element (not shown, e.g., 52a-52c of FIG. 1A) for generating DIFF signal 306a proportional to a magnetic field associated with the object (e.g., the gear 24 of FIGS. 1-1A), wherein the DIFF signal 306a has cycles including a present cycle. The circuit 300 generates a motion signal 308a indicative of the movement of the object, wherein the motion signal 308a has edges associated with the cycles of the DIFF signal 306a.

The motion detector 300 can include a peak identifier circuit 322 coupled to receive and to track portions of the DIFF signal 306a, such as positive and negative peaks in order to provide positive and negative peak tracking signals, or simply peak signals, PDAC 322a and NDAC 322b, respectively.

The motion detector 300 can also include at least one peak sample selection module 326 coupled to receive a peak tracking signal, such as the PDAC signal 322a, configured to save samples 332 of the PDAC signal 322a, configured to select saved samples 332 of the PDAC signal associated with at least one prior cycle of the DIFF signal 306a, and configured to generate a selected peak signal 326a related to the selected samples 332 of the PDAC signal 322a. Since the peak sample selection module 326 is responsive to the positive peak tracking signal 322a, such module 326 may be referred to as the positive peak sample selection module that generates a positive selected peak signal 326a.

In some embodiments, the motion detector 300 can include a second, negative peak sample selection module 344 coupled to receive a different peak tracking signal, such as the NDAC signal 322b, configured to save samples 352 of the NDAC signal 322b, configured to select saved samples 352 of the NDAC signal associated with at least one prior cycle of the DIFF signal 306a, and configured to generate a selected peak signal 344a related to the selected samples 352 of the NDAC signal 322b. Since the peak sample selection module 344 is responsive to the negative peak tracking signal 322b, such module 344 may be referred to as the negative peak sample selection module that generates a negative selected peak signal 344a. Details and operation of the peak sample selection module 344 are similar to the peak sample selection module 326.

The motion detector 300 can also include a threshold generator circuit 380 that is responsive to the positive selected peak signal 326a, the negative selected peak signal 344a (in those embodiments containing the negative peak sample selection module 344), and that provides a threshold signal 316. The threshold generator circuit 380 computes the threshold signal 316 based on the selected peak signals 326a and 344a, which threshold signal 316 may provide threshold signals 216a-216h of FIG. 3. The threshold generator 380 may include a resistor divider 382 having a first tap 382a coupled to a first switch 384 and a second tap 382b coupled to a second switch 386. The first switch 384 is controlled by the PosComp signal 308a and the second switch 386 is controlled by an inverted version, N-PosComp, of the PosComp signal. With this arrangement, the threshold signal 316 is provided by the tap 382a at a first level corresponding to a first percentage of the difference between the positive selected peak signal 326a and the negative selected peak signal 344a when the DIFF signal 306a exceeds the threshold signal 316 and by the tap 382b at a second level corresponding to a second percentage of the difference between the positive selected peak signal 326a and the negative selected peak signal 344a when the DIFF signal is less than the threshold signal 316.

In embodiments in which the negative peak sample selection module 344 is not present, the NDAC signal 322b can be coupled directly to the resistor divider 382 in place of the negative selected peak signal 344a. It will be appreciated by those of ordinary skill in the art that arrangements are possible for generating the threshold signal 316 from just one or the other of the PDAC and NDAC signals or of the positive selected peak signal and negative selected peak signal, respectively. As one example, the positive selected peak signal 326a can be coupled to the resistor divider and the other end of the resistor divider can be coupled to a reference potential. A tap of the resistor divider can provide a threshold signal as a percentage of the coupled signal (e.g., the positive selected peak signal) and the other, non-coupled signal (e.g., the negative selected peak signal) can be estimated by taking the inverse of the measured signal.

The motion detector 300 includes a comparator 308 coupled to receive the threshold signal 316 and the DIFF signal 306a, configured to compare the threshold signal 316 with the DIFF signal 306a, and configured to generate the motion signal 308a.

The peak sample selection module 326 can include an analog-to-digital converter 328 coupled to receive the PDAC signal 322a and configured to generate digital samples 328a of the PDAC signal 322a.

The peak sample selection module 326 can also include a digital memory 330 such as in the form of a shift register that can be sized to hold N samples associated with N cycles of the DIFF signal 306a. In one embodiment, the digital memory 330 is configured to store at least four samples of the PDAC signal 322a associated with four cycles of the DIFF signal; namely a sample from the present cycle and samples from each of the three cycles immediately preceding the present cycle. It will be appreciated by those of ordinary skill in the art that samples from not only one or more prior revolutions and from one or more target features from such revolutions can be stored, but also the number of samples stored can be varied.

However, as noted with respect to FIGS. 3 and 3A, various combinations of peak signal samples can be used to generate the thresholds and thus, various combinations of PDAC signal samples may be stored in the memory 330. For example, the memory 330 can store samples of the PDAC signal 322a associated with M revolutions of the target 24, each one of the revolutions associated with N samples. Thus, in some embodiments, the memory 330 can be sized to hold M×N multi-bit samples of the PDAC signal 322a. In some embodiments, the digital memory 330 can store samples of the PDAC signal 322 not associated with every target features 24a-24c (i.e., every DIFF signal cycle), but associated with only some of the target features. In other embodiments, the digital memory 330 can store samples of the PDAC signal 322a not associated with every target revolution, but associated with only some revolutions. In general, the stored samples can be from all or some previous revolutions from which revolutions the stored samples can be from all or some target features from those revolutions. These arrangements can use a reduced amount of digital memory 330 and a reduced amount of circuit die area. Another use for retaining the history of PDAC signal in the memory 330 is that, if a peak associated with a particular target feature (i.e., gear tooth) deviates greatly from revolution to revolution, the deviation can be used to indicate a fault in the magnetic field sensor 300.

The peak sample selection module 326 can also include a function processor 336 coupled to the digital memory 330 and configured to process a plurality of selected samples 332a selected from among the stored samples 332. The function processor 336 can be an averaging circuit responsive to a control signal 334a for selecting x particular samples 332a to be averaged in order to provide an averaged signal 336a. Each one of the x sample words is clocked to a new sample word in accordance with transitions of the PosComp signal 308a and thus, each of the x sample words is actually a stream of sample words, each representative of a particular cycle of the DIFF signal 306a at or prior to a present cycle of the DIFF signal 306a. Thus, when referring to a sample, it will be understood that the sample is actually a stream of samples. The signal 336a provides a stream of samples, each one of which is an average of a set of x samples 332a.

In other embodiments, the signal 336a is an RMS average of each set of x samples 332a. In other embodiments, the signal 336a is a weighted average of the each set of x samples 332a, for example, taking more recent samples with a higher weight than earlier samples. It will be appreciated that other combinations of samples may be achieved with the function processor 336.

The peak sample selection module 326 can also include a multiplexer 338 configured to select any number of the stored samples 332 of the PDAC signal 322a, each selected sample 332b associated with a different cycle of the DIFF signal 306a. The multiplexer 338 can select the y sample words 332b in response to a control signal 334b.

The multiplexer 338 is configured to provide either the y selected samples 332b (which can be one or more samples) to a DAC 340 or the averaged samples 336a to the DAC 340 under the control of a control signal 334b. More particularly, a control circuit 346 provides the control signals 334a and 334b to control how many (x) and which of the stored samples 332 are processed by the function processor 336, how many (y) and which of the stored sample(s) 332b are coupled directly to the multiplexer 338, and which of the streams 336a, 332b provide the multiplexer output signal 338a coupled to the DAC 340. For example, for a time shortly after the circuit 300 is first powered on, e.g., during a calibration time period, the multiplexer 338 can select as its output signal 338a, the peak signal sample 332b, and thereafter, e.g., during a running mode of operation, the multiplexer 338 can select as the output signal 338a, the averaged signal 336a. More particularly, during certain times of operation, the peak sample selection module 326 selects one or more samples 332b from the memory 330 on each cycle of the DIFF signal, each respective sample corresponding to the present cycle of the DIFF signal 306a and during other times of operation, the peak sample selection module 326 processes, e.g., averages, selected samples 332a, for example, samples from the present and three prior cycles of the DIFF signal 306a to generate the selected peak signal 326a. This arrangement of selecting samples 332b for passing through the multiplexer without processing during the calibration mode is advantageous, since immediately after power up, there is no threshold history, and peaks from previous cycles are not available and/or are not accurate.

The DAC converter 340 is coupled to receive the signal 338a and configured to generate an analog sample, or more precisely, a series of analog samples 326a (referred to herein as the positive selected peak signal 326a), according to a series of digital samples 338a. It will be appreciated that a filter (not shown) can be used to smooth the selected peak signal 326a. It will also be appreciated that the peak signal samples may be stored in the register 330 in analog form, in which case the analog-to-digital converter 328 may be omitted and the memory 330 may be replaced by a bucket brigade device (BBD) or the like which will be understood to be an analog shift register capable of storing and shifting discrete analog samples. In this case, an analog function circuit configured to perform a function upon stored analog signal samples may replace the digital function processor 336. The function performed by the analog function module can be the same as or similar to the functions described above in conjunction with the averager of FIG. 5.

Generation of the threshold signal 316 in accordance with a function of a plurality of peak signal samples from prior cycles establishes a more accurate threshold signal 316 and a resulting motion signal 308a that is less susceptible to mechanical irregularities, wobble, or runout of the target 24 or other sensor system disturbances.

Figure 6:
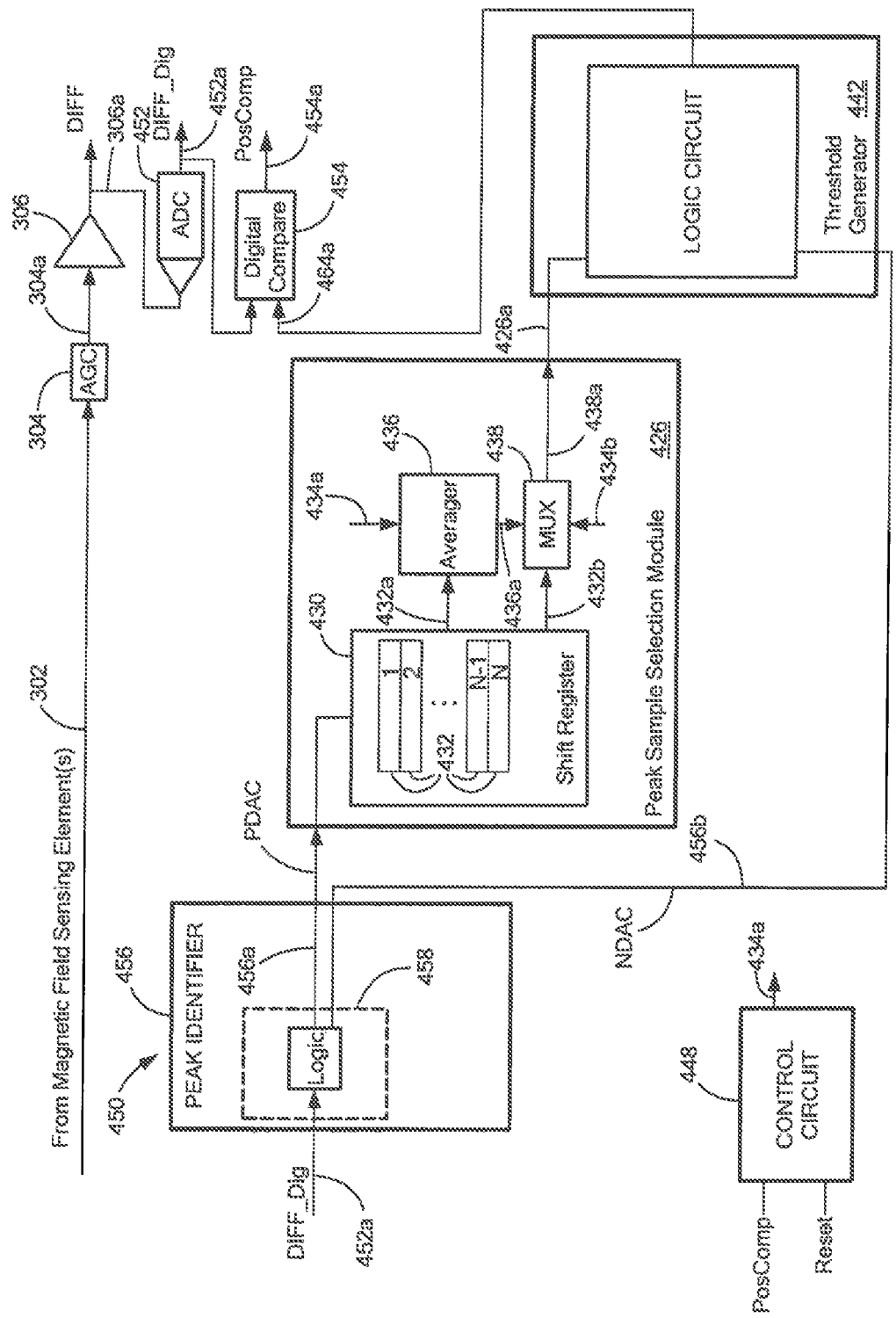
FIG. 6 is a block diagram of another exemplary motion detector that can be as the motion detectors of FIGS. 1, 1A, 2, and 2A, having a digital peak identifier, a peak sample selection module, a threshold generator, and a digital comparator.

Referring now to FIG. 6, in which like elements of FIG. 5 are shown having like reference designations, a circuit 450 can have characteristics similar to those of the circuit 300 of FIG. 5; however, some of the analog circuits shown in FIG. 5 are replaced by corresponding digital circuits. For example, the peak identifier 322 of FIG. 5 can be replaced by a peak identifier 456 that implements the peak identifier functionality of tracking and holding positive and negative peaks of the DIFF signal with a logic circuit 458. The peak identifier logic circuit 458 is coupled to receive a version of the DIFF signal 306a that has been digitized by an analog-to-digital converter 452, and is configured to generate a positive peak tracking PDAC signal 456a and a negative peak tracking NDAC signal 456b, both of which are digital signals.

A peak sample selection module 426 can be entirely digital, not requiring the analog-to-digital converter 328 or the DAC 340 of FIG. 5. The peak sample selection module 426 is configured to generate a positive selected peak signal 426a, similar to the positive selected peak signal 326a of FIG. 5, but which can be a digital signal.

In the embodiment of FIG. 6, a negative peak sample selection module is omitted and the NDAC signal 456b is coupled directly to the threshold generator 442. It will be appreciated that this approach of using a positive selected peak signal 426a and the NDAC signal 456b to generate the threshold 464a may be sufficient to gain at least some of the threshold accuracy benefits of the invention. For example, in some magnetic field sensing element configurations such as those in which a single element detects the target features (e.g., FIG. 1), the positive DIFF signal peaks may vary more significantly and more quickly in response to target anomalies than the negative DIFF signal peaks. Thus, in such embodiments, a negative peak sample selection module may be omitted. Whereas in other magnetic field sensing element configurations, such as those in which multiple elements are used to generate the DIFF signals as the difference between signals from multiple magnetic field sensing elements (e.g., FIG. 1A), the positive and negative peaks of the DIFF signals generally vary to the same extent and in the same manner in response to target anomalies. Thus, in these types of embodiments, it is generally desirable to include both the positive and negative peak sample selection modules.

The circuit 450 can include a digital threshold generator 442 including a logic circuit that, like the analog threshold generator 380 of FIG. 5, can generate a threshold signal 464a that is at a first level corresponding to a first percentage of the difference between the positive selected peak signal 426a and the NDAC voltage 456b when the DIFF_Dig signal 452a exceeds the threshold signal 464a and is at a second level corresponding to a second percentage of the difference between the positive selected peak signal 426a and the NDAC voltage 456b when the DIFF_Dig signal is less than the threshold signal 464a.

The circuit 450 can include a digital comparator 454 coupled to receive an output signal 464a from the threshold generator 442 and also coupled to receive the digitized DIFF_Dig signal 452a. The digital comparator 454 is configured to generate a PosComp signal 454a, which can be the same as or similar to the PosComp signal 308a of FIG. 5.

It will be appreciated that many of the functions of the circuit 450 are implemented with digital circuits that perform the same or similar functions to the analog circuits of the circuit 300 of FIG. 5.

Figure 7:
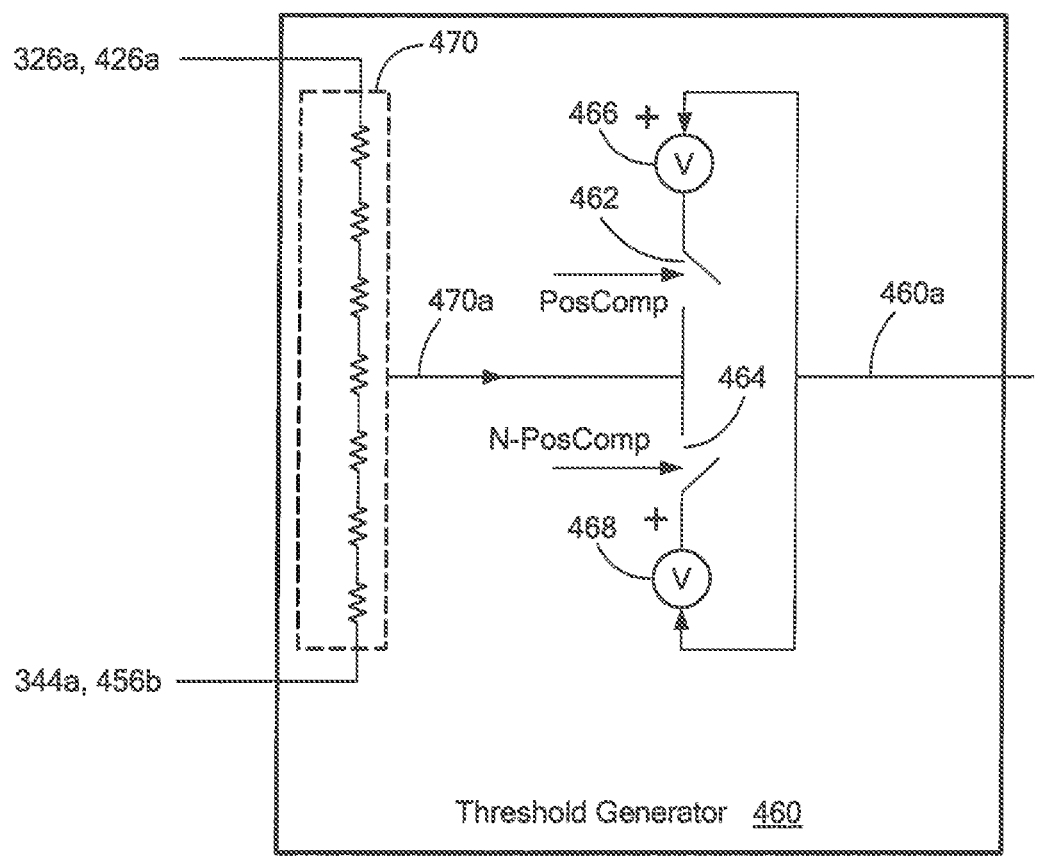
FIG. 7 is a block diagram of an exemplary threshold generator that can be used as the threshold generator of FIGS. 5 and 6.

Referring now to FIG. 7, an alternative threshold generator 460 is shown that may be used in place of the threshold generators of FIGS. 5 and 6. It will be appreciated that in the context of the digital circuitry of FIG. 6, the selected peak signal 426a and NDAC signal 456b would require conversion to an analog form for use of the threshold generator 460. Threshold generator 460 may include a resistor ladder 470 across which the positive selected peak signal, such as 326a of FIG. 5 or signal 426a of FIG. 6, and the negative selected peak signal 344a of FIG. 5 or the NDAC signal 456b of FIG. 6 are coupled.

The resistor ladder 470 may have a center tap 470 at which the 50% point between the voltage across the resistor ladder is provided. The center tap 470a may be coupled to offset voltage sources 466 and 468 via switches 462 and 464, respectively, as shown. The switch 461 may be controlled by the PosComp signal, such as signal 454a of FIG. 6, and the switch 464 may be controlled by an inverted version, N-PosComp, of the PosComp signal. With this arrangement, the threshold signal 460a, which may be the same as or similar to the threshold signal 316 of FIG. 5 or threshold signal 464a of FIG. 6, may be provided as a predetermined offset voltage (established by the voltage source 466) greater than the mid-point between the positive selected peak signal and negative selected peak signal (or NDAC signal) when the DIFF signal is less than the threshold and as a predetermined offset voltage (established by the voltage source 468) less than the mid-point between the positive selected peak signal and negative selected peak signal (or NDAC signal) when the DIFF signal is greater than the threshold.

Figure 8:
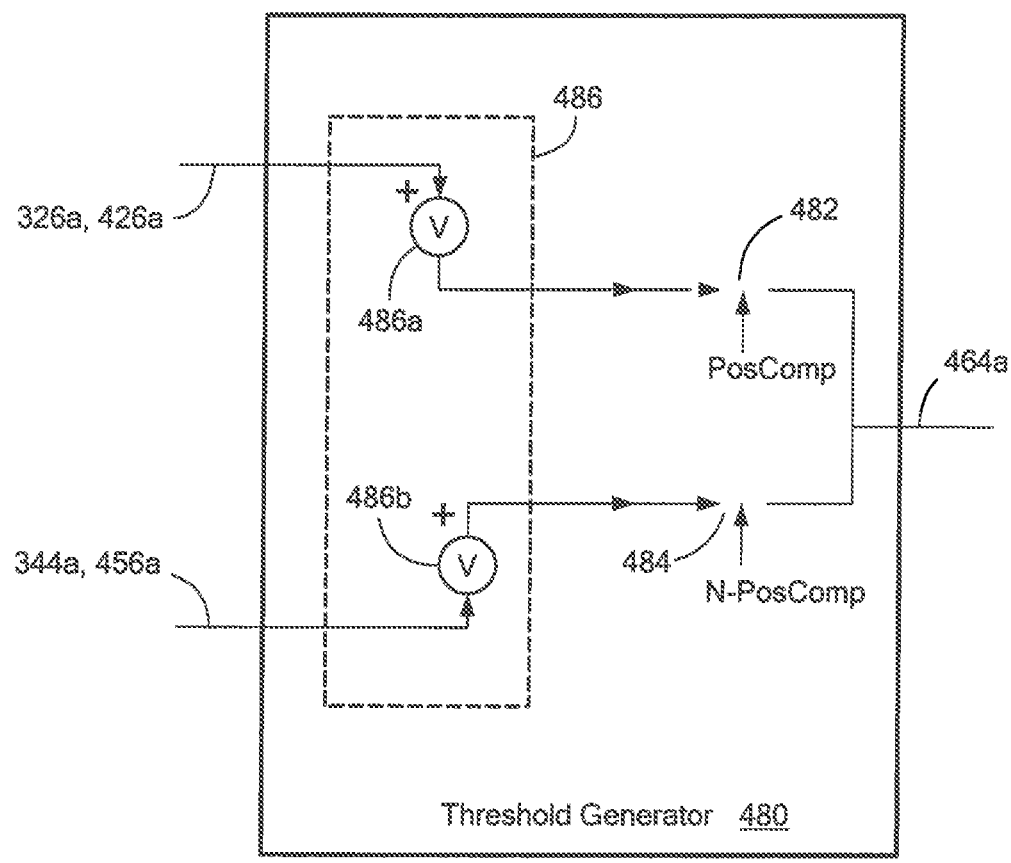
FIG. 8 is a block diagram of yet another exemplary threshold generator that can be used as the threshold generator of FIGS. 5 and 6.

Referring now to FIG. 8, another alternative threshold generator 480 suitable for use in place of the threshold generators of FIGS. 5 and 6 is shown to include an offset voltage source 486 having a first offset voltage source 486a for coupling to the positive selected peak signal 326a of FIG. 5 or 426a of FIG. 6 and a second offset voltage source 486b for coupling to the negative selected peak signal 344a of FIG. 5 or the NDAC signal 456b of FIG. 6. It will be appreciated that in the context of the digital circuitry of FIG. 6, the selected peak signal 426a and NDAC signal 456b would require conversion to an analog form for use of the threshold generator 480.

The offset voltage source 486a is coupled to a switch 482 that is controlled by the PosComp signal and the voltage source 486b is coupled to a switch 484 that is controlled by an inverted version, N-PosComp, of the PosComp signal. With this arrangement, the threshold signal 464a, which may be the same as or similar to the threshold signal 316 of FIG. 5 or threshold signal 464a of FIG. 6, may be provided as a predetermined offset voltage (established by the voltage source 486a) less than the positive selected peak signal when the DIFF signal is less than the threshold and as a predetermined offset voltage (established by the voltage source 486b) greater than the negative selected peak signal (or NDAC signal) when the DIFF signal is greater than the threshold.

Figure 9:
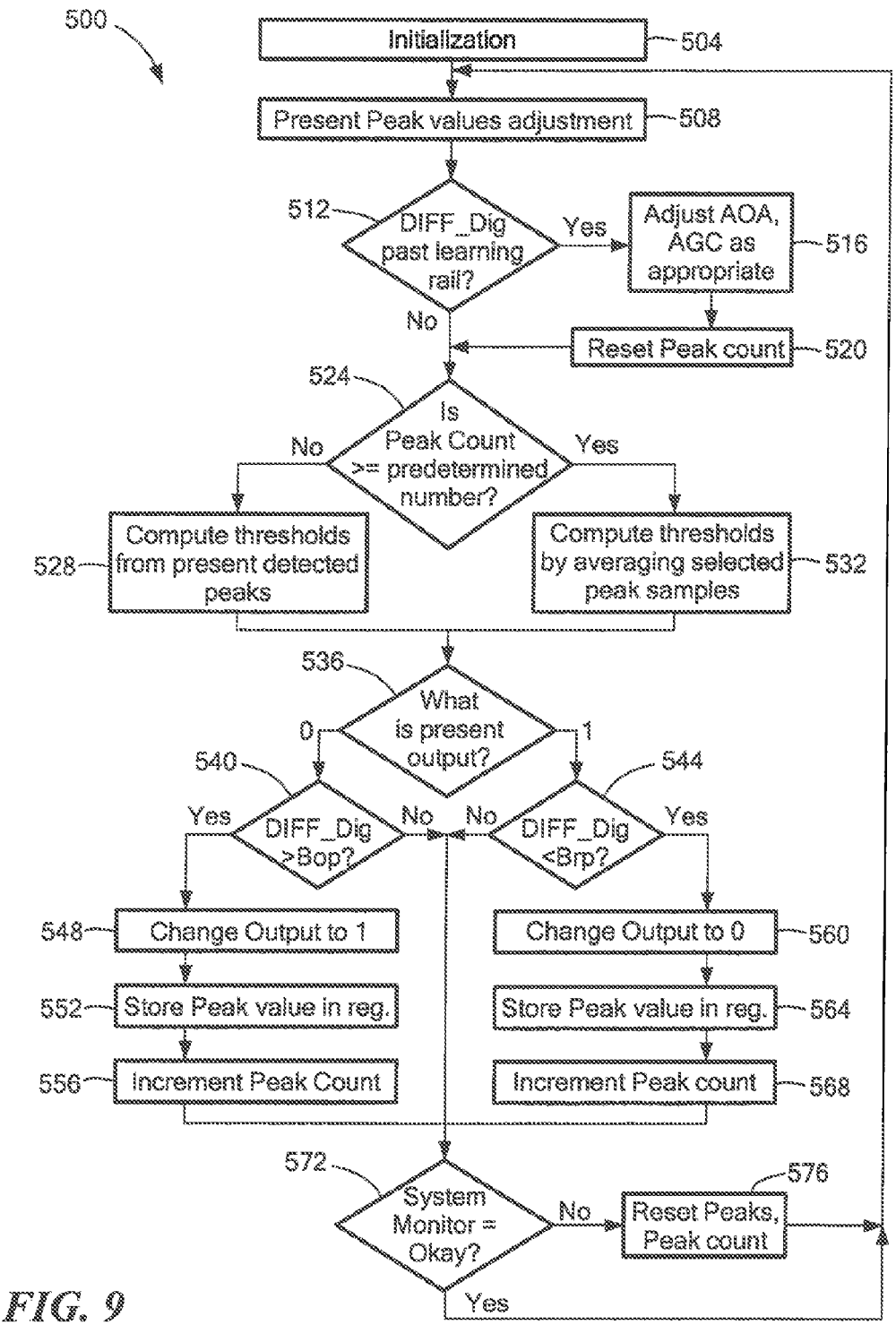
FIG. 9 is a flow diagram showing an illustrative method for generating thresholds for a magnetic field sensor.

Referring now to FIG. 9, a method 500 for computing the threshold signals, such as signals 216a-216h of FIG. 3, begins with an initialization step 504 during which the circuitry is reset to a known state. In step 508, the present peak values of the DIFF signal as tracked by the peak identifier, such as peak identifier 322 of FIG. 5 or peak identifier 456 of FIG. 6, are adjusted, or updated. Various schemes are possible for updating the PDAC and NDAC signal levels, some of which are described in the above-referenced U.S. Pat. No. 6,525,531 and others of which are described in U.S. Patent Application Publication Nos. 2011/0298447, 2011/0298448, and 2011/0298449, which applications are assigned to the Assignee of the subject invention and are hereby incorporated by reference. For example, the update logic of peak identifier 322 of FIG. 5 or logic 458 of peak identifier 456 of FIG. 6 may be configured to allow the PDAC and NDAC voltages to track the DIFF signal outwardly (i.e., the PDAC voltage follows the DIFF signal to its positive peaks and the NDAC voltage follows the DIFF signal to its negative peaks), but upon each transition of the PosComp signal, the PDAC and NDAC voltages selectively allowed to move "inwardly" (i.e., PDAC decreases and NDAC increases) to the level of the DIFF signal.

In a step 512, it is determined whether automatic gain adjustment (AGC) and/or automatic offset adjustment (AOA) functions should be performed, by determining whether the DIFF_Dig signal (or the DIFF signal depending on the embodiment) has passed a learning rail level that is associated with predetermined DIFF signal gain and offset conditions. If it is determined that the DIFF_Dig signal has passed the learning rail, then in step 516, the DIFF_Dig signal offset and/or gain are adjusted, such as with AGC and AOA circuitry and techniques described above. In step 520, a peak count value (e.g., a counter in the control circuit 346 of FIG. 5 or control circuit 448 of FIG. 6) is reset.

Once the DIFF_Dig signal has been gain and/or offset adjusted if necessary, the thresholds are computed starting in step 524 in which it is determined whether a predetermined number of DIFF_Dig signal peaks has occurred, such as four peaks in one embodiment. This step can be achieved with a counter in the control circuit 346 of FIG. 5 or 448 of FIG. 6 for example. If the predetermined number of peaks has not occurred, then in step 528, thresholds are computed based on the peaks in the present DIFF signal cycle, as demonstrated in the shown example, or using a predetermined simpler threshold such as a fixed threshold. For example, in each of the first three DIFF signal cycles in FIG. 3, the thresholds 216a-216f are based on the peaks detected in the respective cycle, as may be achieved by the multiplexer 338 (FIG. 5) passing through the stored peak 332b from the current cycle. Recall that this manner of computing the thresholds is advantageous during an initial, sometimes referred to as a calibration, time period after power up when there is insufficient prior peak history.

If however it is determined that the predetermined number of peaks has occurred, then in step 532, the thresholds are alternatively computed as a function of a predetermined set of stored peak signal samples. For example, upon detecting that four peaks of the DIFF signal have occurred, the thresholds 216g-216h (FIG. 3) may be computed as an average of the peak sample from the current cycle and the peak samples from each of the three prior cycles, as may be achieved by the averager 336 of FIG. 5 for example.

It will be appreciated that alternatively, the average of four samples of the peak signal may be computed from four samples of the peak signal taken during four prior cycles of the DIFF signal (rather than from three samples taken during three prior cycles and a sample taken during the present cycle). It will also be appreciated that while four peak signal samples is discussed in the illustrative embodiment herein for use in generating the thresholds, other numbers of peak signal samples from prior DIFF signal cycles or from prior and present DIFF signal cycles is possible. Use of digital electronics can be conducive to averaging a number of samples that is a power of two (e.g., 2, 4, 8, 16, etc), although other numbers of samples can also be used. The number of averaged samples is generally based on weighing the threshold accuracy benefits against the additional implementation "cost" of processing more samples. The use of four peak signal samples has been found to achieve a worthwhile threshold accuracy improvement over the use of two signal samples and eight signal samples was not found to achieve a significant enough advantage over the use of four signal samples. Occurrence of the predetermined number of peaks can end the calibration mode of operation and begin the running mode of operation in step 532.

Once the thresholds are computed in step 528 or 532, the state of the PosComp signal is determined in step 536. If the state of the PosComp signal is a logic zero, it is determined in step 540 if the DIFF_Dig signal is greater than the operate threshold Bop (e.g., such as threshold 216g of FIG. 3), and if it is, then the PosComp signal level is changed to a logic one in step 548, the PDAC signal is sampled and stored in memory in step 552, and a peak count value maintained in the control circuit, such as control circuit 346 of FIG. 3 or control circuit 448 of FIG. 6, is incremented. Alternatively, if the PosComp signal level is at a logic one, then it is determined in step 544 whether the DIFF_Dig signal is less than the release threshold Brp (e.g., such as threshold 216h of FIG. 3) in step 544, and if it is, then the PosComp signal level is changed to a logic zero in step 560, the NDAC signal is sampled and stored in memory in step 564, and the peak count value is incremented. In other embodiments, it is also possible to store both NDAC and PDAC values at every change of PosComp.

In step 572, a system monitoring function of the control circuit is checked and if the system monitor check is positive, then the process repeats with the peak value adjustment step 508. Alternatively, if the system monitor check is negative, then the PDAC and NDAC (e.g., the PDAC and NDAC in the peak identifier 322 of FIG. 5) and the peak count value (e.g., the counters in the peak identifier 322 of FIG. 5) are reset in step 576 following which the process repeats with the peak value adjustment step 508, as shown. The system monitoring function of the control circuit can monitor various system functions. As one example, an additional set of thresholds is compared to the DIFF signal and if several transitions occur based on the additional thresholds when no transitions occurred based on the above-described thresholds, then a fault indication is provided.

It should be appreciated that parts of the circuits of FIGS. 5-8 can be interchanged with each other. For example, an analog peak sample selection module such as the peak sample selection module 326 of FIG. 5 can be used in the circuit of FIG. 6.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A circuit for detecting a movement of an object, comprising:
   a magnetic field sensing element for generating a magnetic field signal proportional to a magnetic field associated with the object, wherein the magnetic field signal has cycles including a present cycle;
   a motion detector configured to generate a motion signal indicative of the movement of the object, wherein the motion signal has edges associated with the cycles of the magnetic field signal, wherein the motion detector comprises:
      a peak identifying circuit for tracking at least one of a positive peak of the magnetic field signal or a negative peak of the magnetic field signal to provide a peak signal;
      a peak sample selection module coupled to receive the peak signal, configured to save samples of the peak signal, and configured to select a sample of the peak signal associated with a respective prior cycle of the magnetic field signal to generate a selected peak signal;
      a threshold generator coupled to receive the selected peak signal and configured to generate a threshold signal as a function of the selected peak signal; and
      a comparator coupled to receive the threshold signal, coupled to receive the magnetic field signal, and configured to compare the threshold signal with the magnetic field signal in order to generate the motion signal.

2. The circuit of claim 1, wherein the peak sample selection module is further configured to select a plurality of samples of the peak signal associated with a respective plurality of prior cycles of the magnetic field signal and further comprises a function processor configured to combine the selected plurality of samples of the peak signal to generate the selected peak signal.

3. The circuit of claim 2, wherein the function processor is configured to average the selected plurality of samples of the peak signal to generate the selected peak signal.

4. The circuit of claim 1, wherein the peak sample selection module comprises:
   an analog-to-digital converter coupled to receive the peak signal and configured to convert the peak signal to digital samples of the peak signal;
   a memory coupled to receive the digital samples and configured to save a plurality of the digital samples; and
   a digital-to-analog converter coupled to receive samples related to selected ones of the plurality of the digital samples to provide the selected peak signal.

5. The circuit of claim 4, wherein the memory comprises a multi-bit digital shift register.

6. The circuit of claim 1, wherein the peak sample selection module comprises:
   an analog memory coupled to receive the peak signal and configured to save a plurality of analog samples of the peak signal; and
   a circuit module configured to select analog samples from among the plurality of analog samples to provide the selected peak signal.

7. The circuit of claim 6, wherein the analog memory comprises an analog shift register.

8. The circuit of claim 1, wherein the peak sample selection module comprises a multiplexer configured to select a sample of the peak signal associated with a present cycle of the magnetic field signal or to select samples of the peak signal associated with respective prior cycles of the magnetic field signal in response to a control signal.

9. The circuit of claim 8 wherein the control signal causes the multiplexer to select the sample of the peak signal associated with the present cycle of the magnetic field signal during a calibration mode of operation before a predetermined number of cycles of the magnetic field signal have occurred and causes the multiplexer to select the samples of the peak signal associated with the respective prior cycles of the magnetic field signal during a running mode of operation after the predetermined number of cycles of the magnetic field signal have occurred.

10. The circuit of claim 1, wherein the threshold generator is configured to generate first and second different threshold signals based on the state of the motion signal.

11. The circuit of claim 1, wherein the peak identifying circuit comprises at least one of:
   a PDAC configured to generate a PDAC signal as the peak signal to track the magnetic field signal during a PDAC update time interval and to hold the magnetic field signal at times outside of the PDAC update time interval; or
   an NDAC configured to generate an NDAC signal as the peak signal to track the magnetic field signal during an NDAC update time interval and to hold the magnetic field signal at times outside of the NDAC update time interval.

12. The circuit of claim 1, wherein the threshold generator comprises a resistor divider coupled to receive the selected peak signal, and configured to generate the threshold signal.

13. The circuit of claim 12, wherein the threshold generator comprises:
   a first voltage source coupled to the resistor divider and configured to generate a first threshold signal; and
   a second voltage source coupled to the resistor divider and configured to generate a second threshold signal.

14. The circuit of claim 1, wherein the threshold generator comprises a digital logic circuit.

15. The circuit of claim 1, wherein the magnetic field sensing element comprises at least two magnetic field sensing elements for generating a first magnetic field signal and a second magnetic field signal, wherein the first magnetic field signal has cycles including a present cycle and the second magnetic field signal has cycles including a present cycle, wherein the motion detector comprises first and second motion detectors coupled to receive the first and second magnetic field signals, respectively, wherein the first motion detector is configured to generate a first motion signal indicative of the movement of the object, and wherein the second motion detector is configured to generate a second motion signal indicative of the movement of the object.

16. The circuit of claim 1, further comprising a magnet in proximity to the magnetic field sensing element for generating the magnetic field.

17. The circuit of claim 16 wherein the magnet, the magnetic field sensing element, and the motion detector are provided in a single integrated circuit package.

18. A method of detecting a movement of an object, comprising the steps of:

generating a magnetic field signal proportional to a magnetic field associated with the object, wherein the magnetic field signal has cycles including a present cycle; and generating a motion signal indicative of the movement of the object, wherein the motion signal has edges associated with the cycles of the magnetic field signal, wherein the generating the motion signal comprises:

generating a peak signal in accordance with peaks of the magnetic field signal;

saving samples of the peak signal;

selecting a sample of the peak signal associated with a respective prior cycle of the magnetic field signal;

generating a selected peak signal related to the selected samples of the peak signal;

generating a threshold signal based on the selected peak signal; and comparing the threshold signal with the magnetic field signal to generate the motion signal.

19. The method of claim 18, wherein the method further comprises the steps of:

selecting a plurality of samples of the peak signal associated with a respective plurality of prior cycles of the magnetic field signal; and combining the plurality of samples of the peak signal to generate the selected peak signal.

20. The method of claim 19, wherein the combining comprises averaging the plurality of samples of the peak signal to generate the selected peak signal.

21. The method of claim 20, wherein the saving comprises converting the peak signal to digital samples and saving a plurality of the digital samples, and wherein the generating the selected peak signal comprises generating the selected peak signal in accordance with samples related to the selected ones of the plurality of the digital samples.

22. The method of claim 20, wherein the saving the plurality of the digital samples comprises saving the plurality of the digital samples in a multi-bit digital shift register.

23. The method of claim 20, wherein the saving comprises saving analog samples of the peak signal.

24. The method of claim 23, wherein the saving the analog samples comprises saving the analog samples of the peak signal in an analog memory comprising an analog shift register.

25. A method of detecting movement of an object, comprising the steps of:

generating a magnetic field signal with a magnetic field sensing element, wherein the magnetic field signal is proportional to a magnetic field associated with the object, wherein the magnetic field signal has cycles including a present cycle;

generating a peak signal that tracks at least a portion of the magnetic field signal;

using the peak signal to generate a selected peak signal in accordance with a prior cycle of the magnetic field signal prior to the present cycle;

generating a threshold signal based on the selected peak signal; and comparing the threshold signal to the magnetic field signal.

26. The method of claims 25, wherein the using comprises:

selecting a first sample of the peak signal a first predetermined number of cycles prior to the present cycle;

selecting a second sample of the peak signal a second predetermined number of cycles prior to the present cycle; and averaging the first and second samples to generate the selected peak signal.

* * * * *

UNITED STATES PATENT AND TRADEMARK OFFICE
CERTIFICATE OF CORRECTION

Page 1 of 1

PATENT NO.        : 8,723,512 B1
APPLICATION NO.   : 13/685287
DATED             : May 13, 2014
INVENTOR(S)       : Eric Burdette et al.

It is certified that error appears in the above-identified patent and that said Letters Patent is hereby corrected as shown below:

In the Specification

Column 5, line 13 delete "is" and replace with --is a--.

Column 7, line 59 delete "features of associated" and replace with --features associated--.

Column 19, line 34-35 delete "voltages selectively" and replace with --voltages are selectively--.

Signed and Sealed this
Fifteenth Day of September, 2015

Michelle K. Lee
*Director of the United States Patent and Trademark Office*